US008755649B2

(12) United States Patent
Yilmaz et al.

(10) Patent No.: US 8,755,649 B2
(45) Date of Patent: Jun. 17, 2014

(54) IN-LINE FORWARD/BACKWARD FIBER-OPTIC SIGNAL ANALYZER

(75) Inventors: Tolga Yilmaz, Bothell, WA (US); Khush Brar, Bothell, WA (US); Charles A. Lemaire, Apple Valley, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 728 days.

(21) Appl. No.: 12/854,868

(22) Filed: Aug. 11, 2010

(65) Prior Publication Data
US 2011/0091155 A1 Apr. 21, 2011

Related U.S. Application Data

(60) Provisional application No. 61/253,041, filed on Oct. 19, 2009, provisional application No. 61/263,736, filed on Nov. 23, 2009, provisional application No. 61/343,947, filed on Apr. 12, 2010, provisional application No. 61/343,948, filed on Apr. 12, 2010, provisional application No. 61/343,945, filed on Apr. 12, 2010, provisional application No. 61/343,949, filed on Apr. 12, 2010, provisional application No. 61/343,946, filed on Apr. 12, 2010.

(51) Int. Cl.
*G02B 6/26* (2006.01)
*G02B 6/42* (2006.01)
*H01S 3/00* (2006.01)
*H04B 10/25* (2013.01)

(52) U.S. Cl.
USPC ............... 385/31; 385/18; 385/30; 385/42; 385/47; 359/333; 359/341.1

(58) Field of Classification Search
CPC .... G02B 6/262; G02B 6/4214; G02B 6/3512; G02B 6/3548; G02B 6/1817

USPC ......... 385/18, 27, 31, 38, 42, 47, 48, 122, 30; 359/333, 341.1, 341.2, 341.3, 341.31, 359/341.33
See application file for complete search history.

(56) References Cited

U.S. PATENT DOCUMENTS 3,728,117 A   4/1973   Heidenhain et al.
4,313,648 A   2/1982   Yano et al.
(Continued)

FOREIGN PATENT DOCUMENTS

WO   PCTUS0880566   3/2011

OTHER PUBLICATIONS

Boechat, Alvaro A.P., et al., "Bi-directional cladding power monitor for fibre optic beam delivery systems", "Measurement Science and Technology", Sep. 1992, pp. 897-901, vol. 3, No. 9.

*Primary Examiner* — Kaveh C. Kianni
*Assistant Examiner* — Hung Lam
(74) *Attorney, Agent, or Firm* — Charles A. Lemaire; Jonathan M. Rixen; Lemaire Patent Law Firm, P.L.L.C.

(57) ABSTRACT

An optical connector having a plurality of directional taps and connecting between a plurality of optical waveguides (e.g., such as a connector between a waveguide that is part of, or leads from, a seed laser and/or an initial optical-gain-fiber power amplifier, and a waveguide that is part of, or leads to, an output optical-gain-fiber power amplifier and/or a delivery fiber), wherein one of the directional taps extracts a small amount of the forward-traveling optical output signal from the seed laser or initial power amplifier (wherein this forward-tapped signal is optionally monitored using a sensor for the forward-tapped signal), and wherein another of the directional taps extracts at least some of any backward-traveling optical signal that may have been reflected (wherein this backward-tapped signal is optionally monitored using a sensor for the backward-tapped signal).

20 Claims, 8 Drawing Sheets

DEVICE WITH FORWARD AND BACKWARD TAP PORTS

(56) References Cited

U.S. PATENT DOCUMENTS

| | | | |
|---|---|---|---|
| 4,895,790 A | 1/1990 | Swanson et al. | |
| 5,015,058 A | 5/1991 | Thorncraft et al. | |
| 5,319,195 A | 6/1994 | Jones et al. | |
| 5,661,835 A | 8/1997 | Kato et al. | |
| 5,694,114 A | 12/1997 | Udd | |
| 5,812,307 A | 9/1998 | Naganuma | |
| 5,901,260 A * | 5/1999 | Braun | 385/24 |
| 5,907,436 A | 5/1999 | Perry et al. | |
| 5,933,271 A * | 8/1999 | Waarts et al. | 359/341.31 |
| 6,097,863 A | 8/2000 | Chowdhury | |
| 6,192,062 B1 | 2/2001 | Sanchez-Rubio et al. | |
| 6,208,679 B1 | 3/2001 | Sanchez-Rubio et al. | |
| 6,212,310 B1 | 4/2001 | Waarts et al. | |
| 6,411,428 B1 | 6/2002 | Lee | |
| 6,652,158 B2 | 11/2003 | Bartur et al. | |
| 6,822,796 B2 | 11/2004 | Takada et al. | |
| 6,871,025 B2 * | 3/2005 | Maleki et al. | 398/183 |
| 6,958,859 B2 | 10/2005 | Hoose et al. | |
| 7,199,924 B1 | 4/2007 | Brown et al. | |
| 7,391,561 B2 | 6/2008 | Di Teodoro et al. | |
| 7,471,705 B2 | 12/2008 | Gerstenberger et al. | |
| 7,526,167 B1 | 4/2009 | Minelly | |
| 7,539,231 B1 | 5/2009 | Honea | |
| 7,586,671 B2 | 9/2009 | Eiselt | |
| 7,620,077 B2 | 11/2009 | Henderson | |
| 7,671,337 B1 | 3/2010 | Tidwell | |
| 7,768,700 B1 | 8/2010 | Savage-Leuchs | |
| 7,924,496 B2 | 4/2011 | Eiselt | |
| 2003/0043696 A1 * | 3/2003 | Vakoc | 367/149 |
| 2006/0093264 A1 * | 5/2006 | Tabuchi | 385/33 |
| 2006/0120418 A1 * | 6/2006 | Harter et al. | 372/30 |
| 2007/0110363 A1 * | 5/2007 | Miyadera et al. | 385/27 |
| 2008/0077200 A1 | 3/2008 | Bendett et al. | |
| 2009/0168814 A1 * | 7/2009 | Achtenhagen | 372/6 |

* cited by examiner

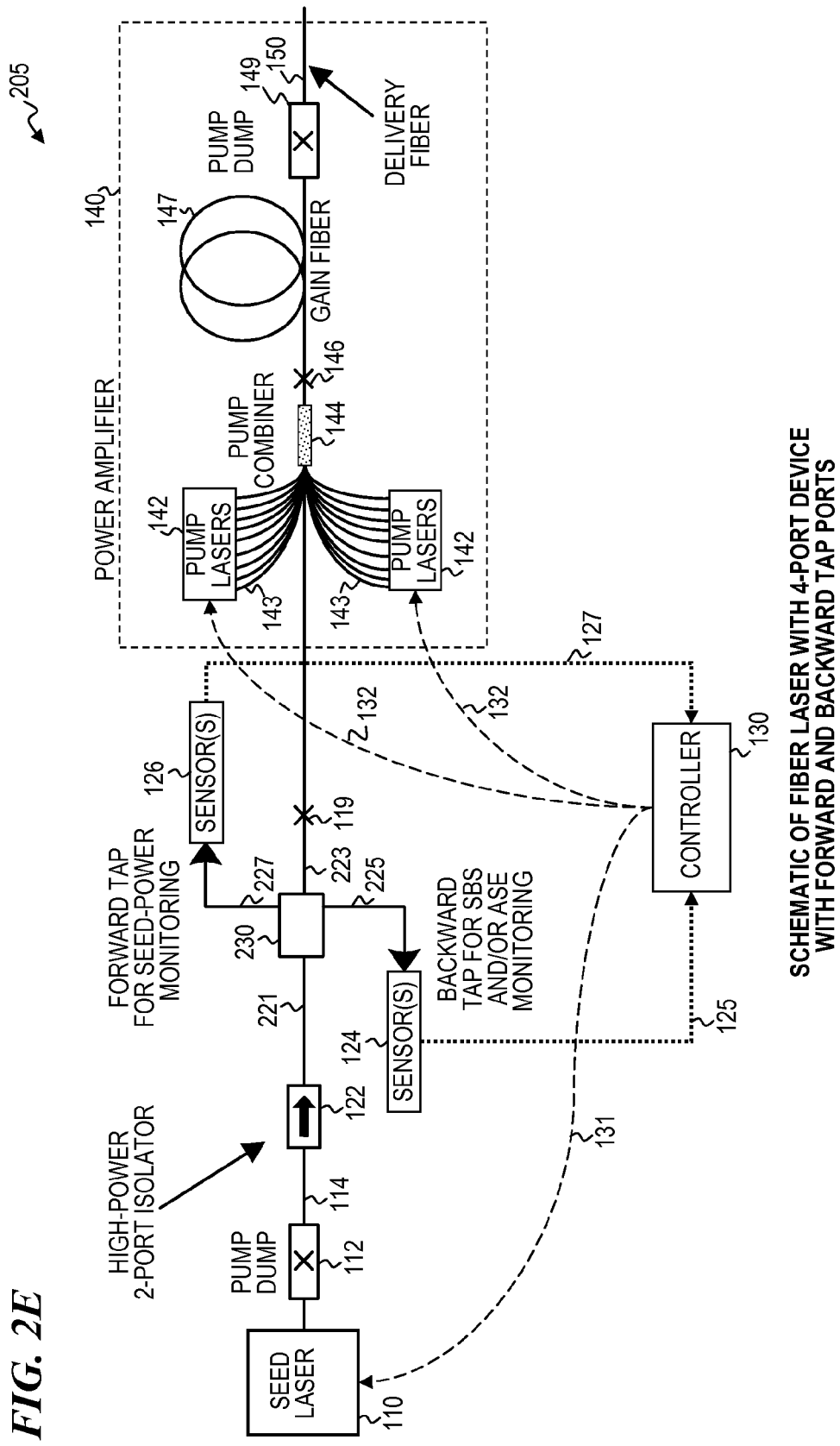

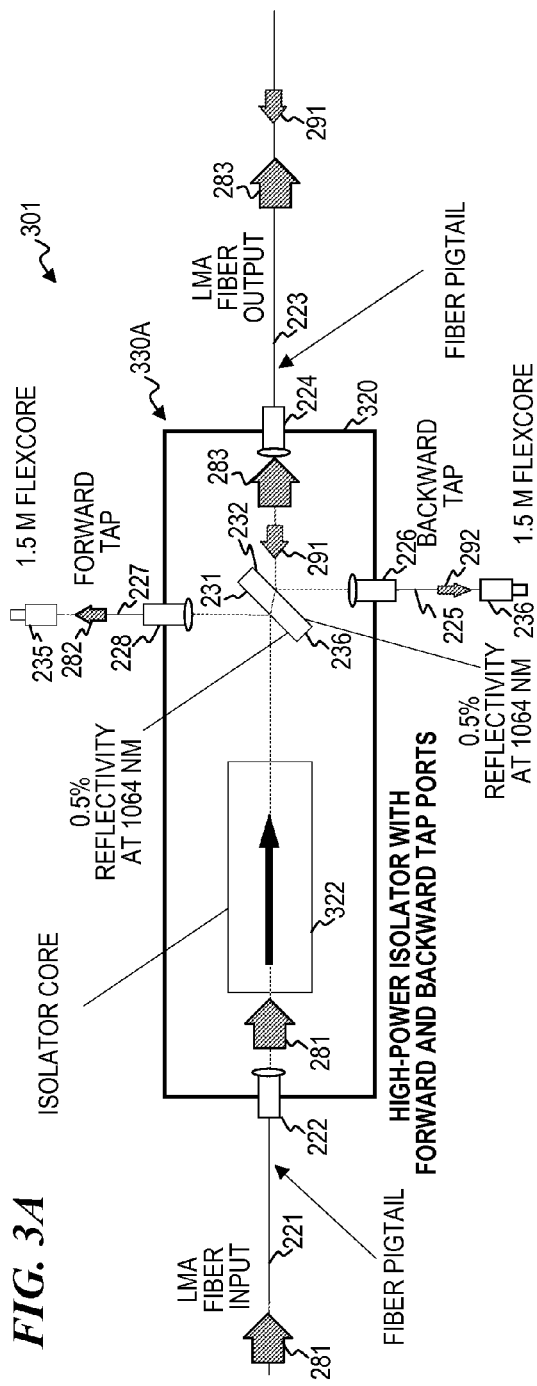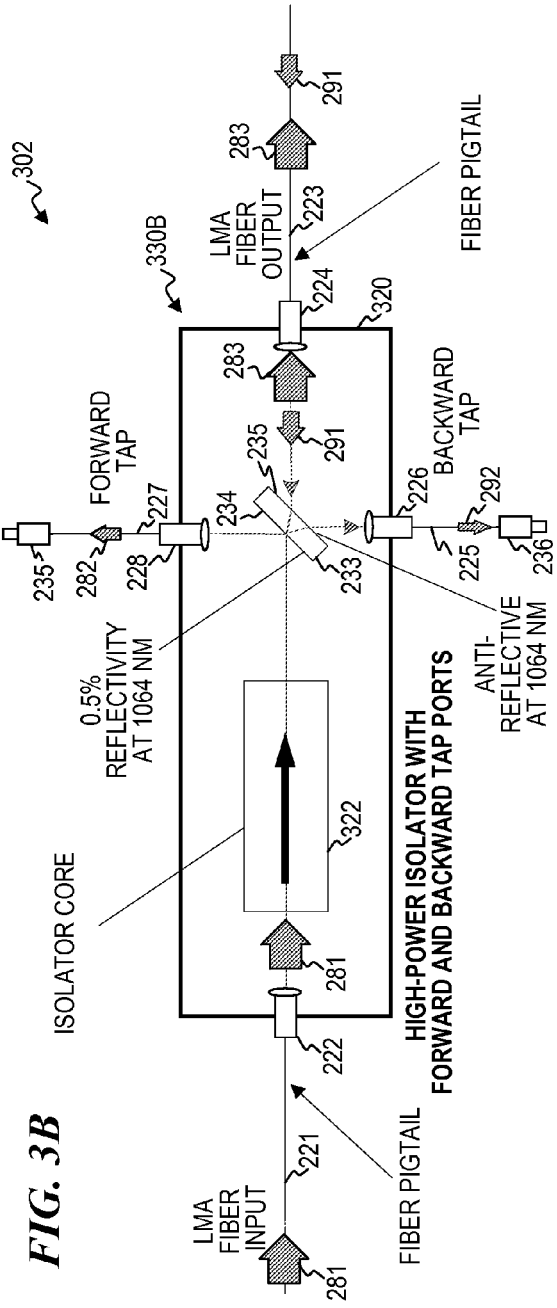

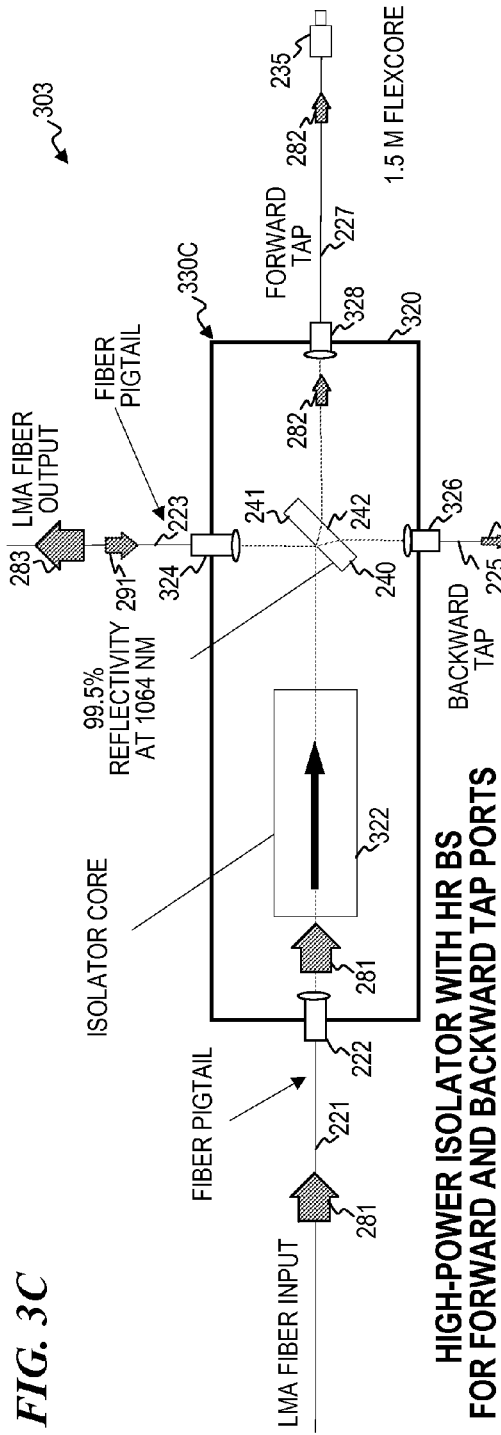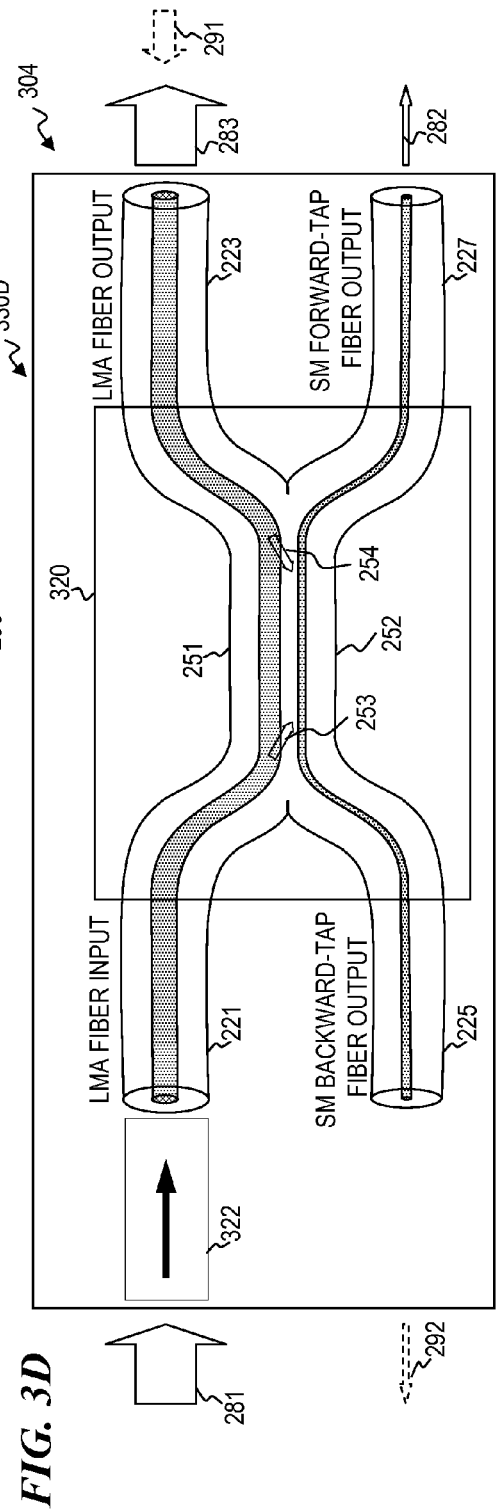

IN-LINE FORWARD/BACKWARD FIBER-OPTIC SIGNAL ANALYZER

CROSS-REFERENCE TO RELATED APPLICATIONS

This application claims benefit under 35 U.S.C. §119(e) of

U.S. Provisional Patent Application No. 61/253,041 filed Oct. 19, 2009, by Tolga Yilmaz et al., titled "Fiber-Pigtailed Isolator with Tap Ports for Forward and Backward Optical Signal Monitoring";

U.S. Provisional Patent Application No. 61/263,736 filed Nov. 23, 2009, by Matthias P. Savage-Leuchs et al., titled "Q-Switched Oscillator Seed-Source for MOPA Laser Illuminator Method and Apparatus";

U.S. Provisional Patent Application No. 61/343,947 filed Apr. 12, 2010, by Matthias P. Savage-Leuchs, titled "High-Power Laser System having Delivery Fiber with Non-Circular Cross Section for Isolation Against Back Reflections";

U.S. Provisional Patent Application No. 61/343,948 filed Apr. 12, 2010, by Matthias P. Savage-Leuchs, titled "High Beam Quality and High Average Power from Large-Core-Size Optical-Fiber Amplifiers; Signal and Pump Mode-Field Adaptor for Double-Clad Fibers and Associated Method";

U.S. Provisional Patent Application No. 61/343,945 filed Apr. 12, 2010, by Yongdan Hu et al., titled "Apparatus for Optical Fiber Management and Cooling";

U.S. Provisional Patent Application No. 61/343,949 filed Apr. 12, 2010, by Yongdan Hu, titled "Method and Apparatus for In-Line Fiber-Cladding-Light Dissipation"; and U.S. Provisional Patent Application No. 61/343,946 filed Apr. 12, 2010, by Tolga Yilmaz et al., titled "Beam Diagnostics and Feedback System and Method for Spectrally Beam-Combined Lasers";

each of which is incorporated herein by reference in its entirety.

This invention is related to

U.S. Pat. No. 7,526,167 issued Apr. 28, 2009, to John D. Minelly, titled "Apparatus and method for a high-gain double-clad amplifier";

U.S. patent application Ser. No. 11/165,676 titled "Apparatus and Method for Driving Laser Diodes" filed Jun. 24, 2005 (which issued as U.S. Pat. No. 7,792,166 on Sep. 7, 2010), by Lawrence A. Borschowa, U.S. Pat. No. 7,620,077 issued Nov. 17, 2009, to Angus J. Henderson, titled "Apparatus and method for pumping and operating optical parametric oscillators using DFB fiber lasers";

U.S. Pat. No. 7,539,231 issued May 26, 2009, to Eric C. Honea et al. titled "Apparatus and method for generating controlled-linewidth laser-seed-signals for high-powered fiber-laser amplifier systems";

U.S. Pat. No. 7,471,705 issued Dec. 30, 2008, to David C. Gerstenberger et al., titled "Ultraviolet laser system and method having wavelength in the 200-nm range";

U.S. Pat. No. 7,391,561 issued Jun. 24, 2008, to Fabio Di Teodoro et al., titled "Fiber- or rod-based optical source featuring a large-core, rare-earth-doped photonic-crystal device for generation of high-power pulsed radiation and method", U.S. Pat. No. 7,671,337 titled "System and Method for Pointing a Laser Beam" that issued Mar. 2, 2010;

U.S. Pat. No. 7,199,924 issued Apr. 3, 2007, to Andrew J. W. Brown et al., titled "Apparatus and method for spectral-beam combining of high-power fiber lasers";

U.S. Pat. No. 7,768,700 issued Aug. 3, 2010 to Matthias P. Savage-Leuchs, titled "Method and Apparatus for Optical Gain Fiber having Segments of Differing Core Sizes";

U.S. patent application Ser. No. 11/536,642, titled "Apparatus and Method for Stimulation of Nerves and Automated Control of Surgical Instruments," filed Sep. 28, 2006 by Mark P. Bendett et al.;

U.S. patent application Ser. No. 12/018,193 filed Jan. 22, 2008 (which issued as U.S. Pat. No. 7,872,794 on Jan. 18, 2011), by John D. Minelly et al., titled "High-energy eye-safe pulsed fiber amplifiers and sources operating in erbium's L-band";

U.S. patent application Ser. No. 12/624,327 titled "Spectrally Beam Combined Laser System and Method at Eye-Safer Wavelengths," filed Nov. 23, 2009 (which issued as U.S. Pat. No. 8,441,718 on May 14, 2013) by Roy D. Mead; and U.S. patent application Ser. No. 12/793,508 titled "Method and Apparatus for In-Line Fiber-Cladding-Light Dissipation" filed Jun. 3, 2010 (which issued as U.S. Pat. No. 8,355,608 on Jan. 15, 2013), by Yongdan Hu;

each of which is incorporated herein by reference in its entirety.

FIELD OF THE INVENTION

The invention relates generally to optical waveguides and more particularly to an optical connector having a plurality of directional taps and connecting between a plurality of optical waveguides (e.g., such as a connector between a waveguide that is part of, or leads from, a seed laser and/or an initial optical-gain-fiber power amplifier, and a waveguide that is part of, or leads to, an output optical-gain-fiber power amplifier and/or a delivery fiber), wherein one of the directional taps extracts a small amount of the forward-traveling optical output signal from the seed laser or initial power amplifier (wherein this forward-tapped signal is optionally monitored using a sensor for the forward-tapped signal), and wherein another of the directional taps extracts at least some of any backward-traveling optical signal that may have been reflected, formed from amplified spontaneous emission at a signal wavelength in a downstream amplifier, or generated by some non-linear process such as may occur in a delivery fiber (wherein this backward-tapped signal is optionally monitored using a sensor for the backward-tapped signal).

BACKGROUND OF THE INVENTION

Optical systems that produce high-power optical output signals such as optical-fiber based lasers and power amplifiers can suffer damage if a backward-traveling optical signal (e.g., from a reflection of a forward-traveling high-power optical output signal after it has left the power-amplification stage of the laser system) re-enters the power-amplification stage where it can get amplified and then damage components in the laser system. Thus, there is a need in the art for technology and methods that can detect, prevent, and/or mitigate problematic backward-traveling beams, especially in fiber-based optical amplification systems.

Further, spectral beam combining (SBC) of beams from fiber lasers is a promising technology enabling a very-high-power laser system with excellent beam quality. An efficient fiber laser type for such systems can be the ytterbium-doped (Yb) fiber laser, which lases around 1,060 nm. If the output beams from a plurality of such fiber lasers are spectral-beam combined, the resulting optical beam can have extraordinarily high power. There can be a need to detect, prevent, and/or mitigate problematic backward-traveling beams (e.g., from reflections or stimulated Brillouin scattering (SBS)) in SBC systems.

Even when a fiber amplifier or fiber laser is designed to compensate for the above effects, there will be a limit on the maximum power that can be obtained from a single fiber when scaling to larger fiber sizes and/or lengths, pump powers, and the like.

U.S. Pat. No. 6,192,062 to Sanchez-Rubio et al. titled "Beam combining of diode laser array elements for high brightness and power" and U.S. Pat. No. 6,208,679 to Sanchez-Rubio et al. titled "High-power multi-wavelength external cavity laser" describe the fundamental techniques of spectral beam combining, and both are incorporated herein by reference.

In some embodiments of the present invention, the gratings used for spectral-beam combining are "blazed," i.e., formed with V-grooves having sidewall angles that are asymmetrical with respect to a vector normal to the overall surface of the grating. U.S. Pat. No. 3,728,117 to Heidenhain et al. titled "Optical Diffraction Grid" (incorporated herein by reference) describes a method for making blazed gratings having asymmetric grooves. U.S. Pat. No. 4,895,790 to Swanson et al. titled "High-efficiency, multilevel, diffractive optical elements" (incorporated herein by reference) describes a method for making blazed gratings having asymmetric grooves using binary photolithography to create stepped profiles. U.S. Pat. No. 6,097,863, titled "Diffraction Grating with Reduced Polarization Sensitivity" issued Aug. 1, 2000, to Chowdhury (incorporated herein by reference) describes a reflective diffraction grating with reduced polarization sensitivity for dispersing the signals. The Chowdhury grating includes facets that are oriented for reducing efficiency variations within a transmission bandwidth and that are shaped for reducing differences between the diffraction efficiencies in two orthogonal directions of differentiation. U.S. Pat. No. 4,313,648 titled "Patterned Multi-Layer Structure and Manufacturing Method" issued Feb. 2, 1982, to Yano et al. (incorporated herein by reference) describes a manufacturing method for a patterned (striped) multi-layer article.

U.S. Pat. No. 6,822,796 to Takada et al. titled "Diffractive optical element" (incorporated herein by reference) describes a method for making blazed gratings having asymmetric grooves with dielectric coatings. U.S. Pat. No. 6,958,859 to Hoose et al. titled "Grating device with high diffraction efficiency" (incorporated herein by reference) describes a method for making blazed gratings having dielectric coatings.

U.S. Pat. No. 5,907,436 titled "Multilayer dielectric diffraction gratings" issued May 25, 1999, to Perry et al., and is incorporated herein by reference. This patent describes the design and fabrication of dielectric grating structures with high diffraction efficiency. The gratings have a multilayer structure of alternating index dielectric materials, with a grating structure on top of the multilayer, and obtain a diffraction grating of adjustable efficiency, and variable optical bandwidth.

U.S. Pat. No. 6,212,310 titled "High power fiber gain media system achieved through power scaling via multiplexing" issued Apr. 3, 2001, to Waarts et al., and is incorporated herein by reference. This patent describes certain methods of power scaling by multiplexing multiple fiber gain sources with different wavelengths; pulsing or polarization modes of operation is achieved through multiplex combining of the multiple fiber gain sources to provide high power outputs, such as ranging from tens of watts to hundreds of watts, provided on a single mode or multimode fiber.

U.S. Pat. No. 7,586,671 to Eiselt issued Sep. 8, 2009, titled "Apparatus and method for Raman gain control" and is incorporated herein by reference. The Eiselt patent pertains to optical fiber transmission systems, and optical transport systems employing Raman optical amplifiers, and describes an apparatus and method to control the Raman gain based upon power measurements at one end of the transmission fiber.

There is a need for a method and for an optical device that "taps" (obtains at least a portion of) both a forward-propagating optical output beam from a laser system as well as a backward-propagating optical beam (such as from a reflection), and, based on automatic analyses of the forward and backward portion(s), controls at least one aspect of the operation of the laser system.

SUMMARY OF THE INVENTION

Various embodiments of the present invention provide a device and method that provide simultaneous taps of forward-propagating and backward-propagating optical signals in fiber-optic systems for sensing, analysis and/or control. The figures depict a number of various illustrative embodiments of the present invention. Some embodiments include circuits and/or microprocessors that analyze the signals from the forward tap(s) and backward tap(s) (e.g., to determine power levels, spectral content, or the like), and that provide control signals to operate laser seed source(s), pump lasers, light gates, or the like.

In some embodiments, the tapping and sensing provide a measurement of the forward-propagating signal that indicates the health of the optical-signal source (e.g., the seed laser and/or optical-amplification stages in some embodiments) that precedes the measurement point (i.e., the upstream parts of the system that generate the forward-propagating signal). In some embodiments, one or more power-level measurements of the forward-propagating signal are used in a feedback loop to maintain the forward signal's power level at a desired (e.g., constant) value. In the case of significant reduction (or increase) of the forward signal, the feedback system can turn off the laser system to mitigate any catastrophic damage that might otherwise occur to the amplifier stage(s).

The backward-propagating signal may contain amplified spontaneous emission (ASE) signals, stimulated Brillouin scattered (SBS) signals generated in a downstream amplifier stage, and/or reflections of the forward-propagating signal. In some embodiments, the SBS power level measured in the backward-propagating signal (using signals obtained from the backward tap(s)) is used in a feedback loop to turn off the laser system if the SBS signal power exceeds a preset level, in order to mitigate any catastrophic damage to the amplifier. ASE measurement is useful for characterizing amplifier saturation. Forward ASE-level measurement may be difficult or not feasible in some laser systems due to lack of access to the high-power laser output (at the output of a downstream optical amplifier). In such cases, the backward power measurements (measurements of the backward-propagating signal from the input end of the downstream optical amplifier) can be used for determining the ASE level and amplifier saturation of the downstream optical amplifier.

In some embodiments, the present invention accomplishes the following: the various discussed embodiments enable the measurement of the generated SBS and ASE, as well as forward-propagating-signal level in high-power fiber lasers (which may include power oscillator configurations in which the high-power amplification is within the lasing cavity, as well as master-oscillator-power-amplifier (MOPA) configurations in which the high-power amplification is outside and downstream of the lasing cavity). The measured power of the forward-propagating signal can then be used in feedback loops to maintain the laser-system stability and safe operation of the system in the long term. Various specific benefits of each of the embodiments are discussed in their respective sections below.

In some embodiments, the present invention provides an integrated isolator with tap ports, in order to provide a signal monitor, power monitor, and/or SBS monitor for a fiber laser and/or fiber amplifier that may generate ASE, SBS, or incur reflections of the output optical signal back into the system.

BRIEF DESCRIPTION OF THE DRAWINGS

FIG. 2E is a schematic block diagram of a laser system 205, according to some embodiments of the present invention.

FIG. 3A is a schematic block diagram of a four-port isolating beam-splitter assembly 301 according to some embodiments of the present invention.

FIG. 3B is a schematic block diagram of an alternative four-port isolating beam-splitter assembly 302 of the present invention.

FIG. 3C is a schematic block diagram of another alternative four-port beam-splitter assembly 303, according to some embodiments of the present invention.

FIG. 3D is a schematic block diagram of yet another alternative four-port-beam splitter assembly 304, according to some embodiments of the present invention.

DETAILED DESCRIPTION

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention. Further, in the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component that appears in multiple figures. Signals and connections may be referred to by the same reference number or label, and the actual meaning will be clear from its use in the context of the description.

In some embodiments, the present invention provides an apparatus and process wherein both the forward-propagating signal and the backward-propagating signal are tapped and analyzed (e.g., the power levels at one or more spectral wavelengths of both the forward-propagating signal and the backward-propagating signal are sensed and one or more electrical signals based on the sensed optical signals are generated) and the resulting sense signals are used (e.g., in a feedback circuit) to control operation of the optical system.

Figure 1:
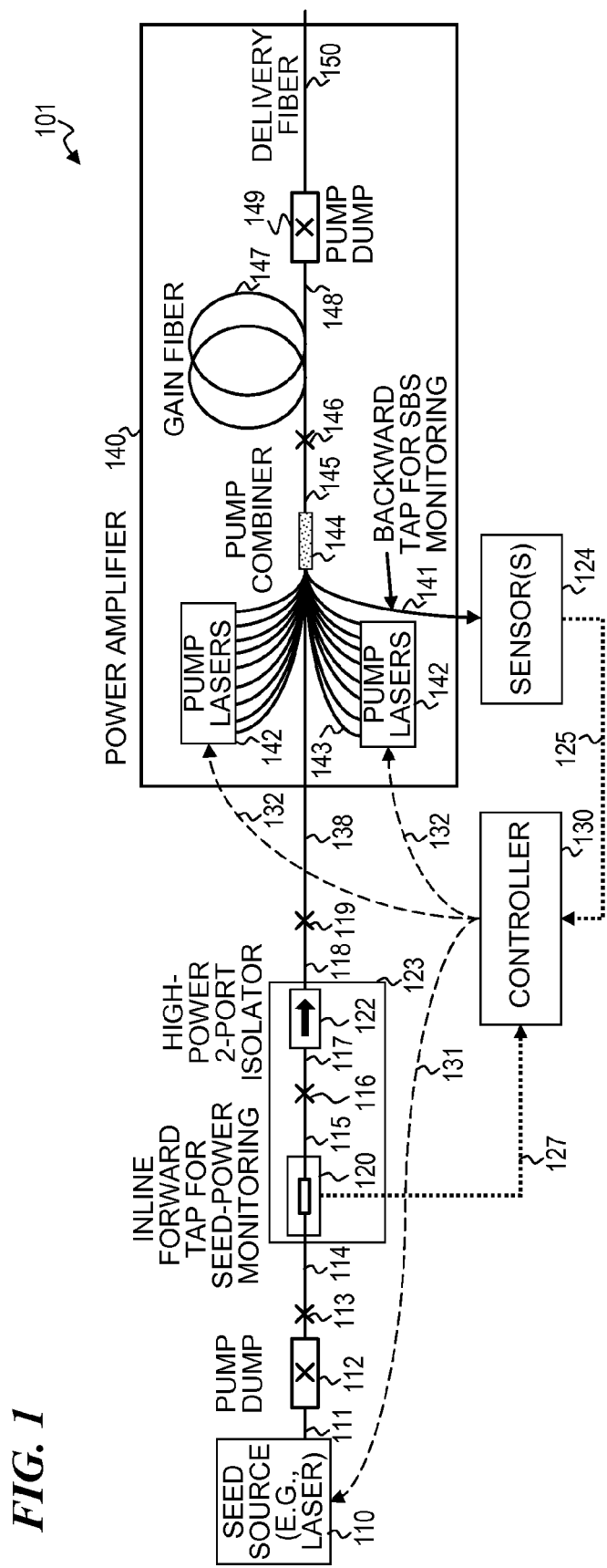
FIG. 1 is a schematic block diagram of a laser system 101, according to some embodiments of the present invention.

FIG. 1 is a schematic block diagram of a laser system 101 according to a first embodiment, where power monitoring only in the backward direction is performed by using one of the pump-combiner legs 143. In some embodiments, each pump-combiner leg 143 has a core that couples pump light into a core of the amplifying gain fiber in a co-propagating direction relative to the signal light. The method used by system 101 is one method of backward power monitoring. Some of the benefits obtained by using system 101 of this first embodiment include providing a diagnostic device for measuring SBS level and ASE level. The configuration used to provide the backward tap is simple and inexpensive, since the pump-combiner with a plurality of legs is already in the system. In addition forward-signal level can be measured using the separate signal tap. One disadvantage of this first embodiment is that one pump-combiner leg is used up for monitoring instead of being available for providing pump power to the amplifier, and thus the maximum pump power that can be provided to the amplifier is compromised (reduced). An additional disadvantage is that if the pump-combiner leg used for monitoring is a multimode fiber having a core diameter of 100 microns ($\mu m$) to 200 microns ($\mu m$), the multimode nature of the fiber results in low-spectral resolution when used for measuring or analyzing optical spectra. The spectral resolution can be increased by splicing a single-mode (SM) fiber to the pump-combiner leg that is used for power monitoring. However, in such a case, the monitored signal power is significantly reduced due to the high splice loss between dissimilar fibers and the spectral signal-to-noise ratio degrades as a result.

FIG. 1 is a schematic block diagram of a laser system 101, according to some embodiments of the present invention. In some embodiments, system 101 includes a seed source 110 (e.g., in some embodiments, seed source 110 includes a laser such as a diode laser or an optical-fiber laser that is optically pumped using light from a diode-laser system) that generates an optical seed signal 111 (in other embodiments, a controlled-bandwidth ASE source is used for generating the seed signal 111, such as described in U.S. Pat. No. 7,539,231 issued May 26, 2009, to Eric C. Honea et al. titled "Apparatus and method for generating controlled-linewidth laser-seed-signals for high-powered fiber-laser amplifier systems," which is incorporated herein by reference). In some embodiments, an optical fiber carrying seed signal 111 is connected between seed source 110 and the input port of a pump dump 112, which passes light of the wavelength of the seed signal but which "dumps" (blocks, diverts or otherwise absorbs) light of the wavelength of the pump light from seed laser 110 or backward-propagating pump light from optical power amplifier 140. In some embodiments, pump dump 112 has an output fiber that is fusion spliced to an optical fiber 114 at splice 113. In some embodiments, optical fiber 114 and/or the optical fiber that carries seed signal 111 is a large-mode-area (LMA) fiber. In some embodiments, optical fiber 114 is an input fiber of an inline tap 120 (sometimes called the forward tap 120) used, optical fiber 115 is an output fiber of forward tap 120, and electrical signal 127 (called the "forward-tap electrical signal") is the output electrical signal that is representative of the optical power of the forward-propagating optical signal in fiber 114. In some embodiments, system 101 includes a two-port optical isolator 122 that is capable of handling high-power optical signals (e.g., pulses having a peak power of at least 1,000 watts, at least 10,000 watts, at least 100,000 watts, or even at least 1,000,000 watts) and that has an input fiber 117 and an output fiber 118. In some embodiments, system 101 also includes a power optical amplifier 140 that is capable of amplifying (and which, when supplied with suitable seed signals and optical pump light, does amplify) high-power optical signals (e.g., such that the output pulses have a peak power of at least 10,000 watts, or at least 100,000 watts or even at least 1,000,000 watts). Power optical amplifier 140 has an input fiber 138 and an output fiber 150 (also called delivery fiber 150). In some embodiments, both input fiber 138 and delivery fiber 150 are LMA fibers. In some embodiments, the output optical fiber 115 from the forward tap 120 is fusion spliced to isolator input fiber 117 of the two-port optical isolator 122 at splice 116, and isolator output fiber 118 of the two-port optical isolator 122 if fusion spliced to input fiber 138 of the power amplifier 140 at splice 119.

In some embodiments, power amplifier 140 includes a plurality of pump lasers 142 that are connected by optical fibers to a pump combiner 144 that inserts the seed signal from power-amplifier input fiber 138 into a core of a multi-clad combiner output LMA fiber 145 and inserts the pump light from pump lasers 142 into an inner cladding (also called a pump cladding) and/or the core of combiner output LMA fiber 145. In some embodiments, combiner output LMA fiber is fusion spliced to gain fiber 147 at splice 146. In some embodiments, gain fiber 147 has a fiber output end 148 (or is spliced to an output fiber 148), wherein fiber 148 is fusion spliced to pump dump 149, which eliminates the residual pump light from the pump lasers 142 and outputs the amplified seed signal from the gain fiber 147 into the core of delivery fiber 150. Backward-propagating light (e.g., from reflected light (going right-to-left from delivery fiber 150) or from amplified spontaneous emission (ASE), stimulated Brillouin scattering (SBS) or other non-linear effects in gain fiber 147 can cause problems if mitigation measures are not taken. In some embodiments, a selected fiber 141 of the plurality of input fibers 143 into pump combiner 144 is not connected to a pump laser, but instead is used as a "backward tap" to obtain a portion of any backward-propagating light from gain fiber 147 and/or delivery fiber 150, and this backward-propagating light is coupled to one or more sensors 124 (e.g., in some embodiments, sensors that detect particular wavelengths that indicate the amount of ASE, or the amount of SBS light, or other wavelengths or other properties of the backward-propagating light that are of interest). The selected fiber 141 is called the "backward tap fiber" and carries an optical signal called the "backward-tap light signal." In some embodiments, the sensors 124 generate one or more electrical signals 125 (called the "backward-tap electrical signal(s)") that are each indicative of the different respective optical properties of the backward-tap signal that were measured by sensors 124.

In some embodiments, the forward-tap electrical signal(s) 127 (from forward tap 120 and representing one or more certain properties of the forward-propagating light) and the backward-tap electrical signal(s) 125 (from backward-tap sensors 124 and representing one or more certain properties of the backward-propagating light) are coupled to controller 130 that is used to control one or more operations of system 101 (e.g., in some embodiments, controller 130 can turn off the electrical power to the pump lasers 142 via electrical control or power line(s) 132, and/or can alter the operation of the seed source 110 via electrical control or power line(s) 131 (e.g., in some embodiments, if the backward tap 141 and sensors 124 indicate a buildup of excess ASE power from gain fiber 147 (e.g., perhaps caused by a lack of seed-signal pulses that would normally use up the optical pump power), controller 130 can force the seed source 110 to emit a continuous-wave (CW) signal that would bleed the excess stored energy from the gain fiber).

Figure 2A:
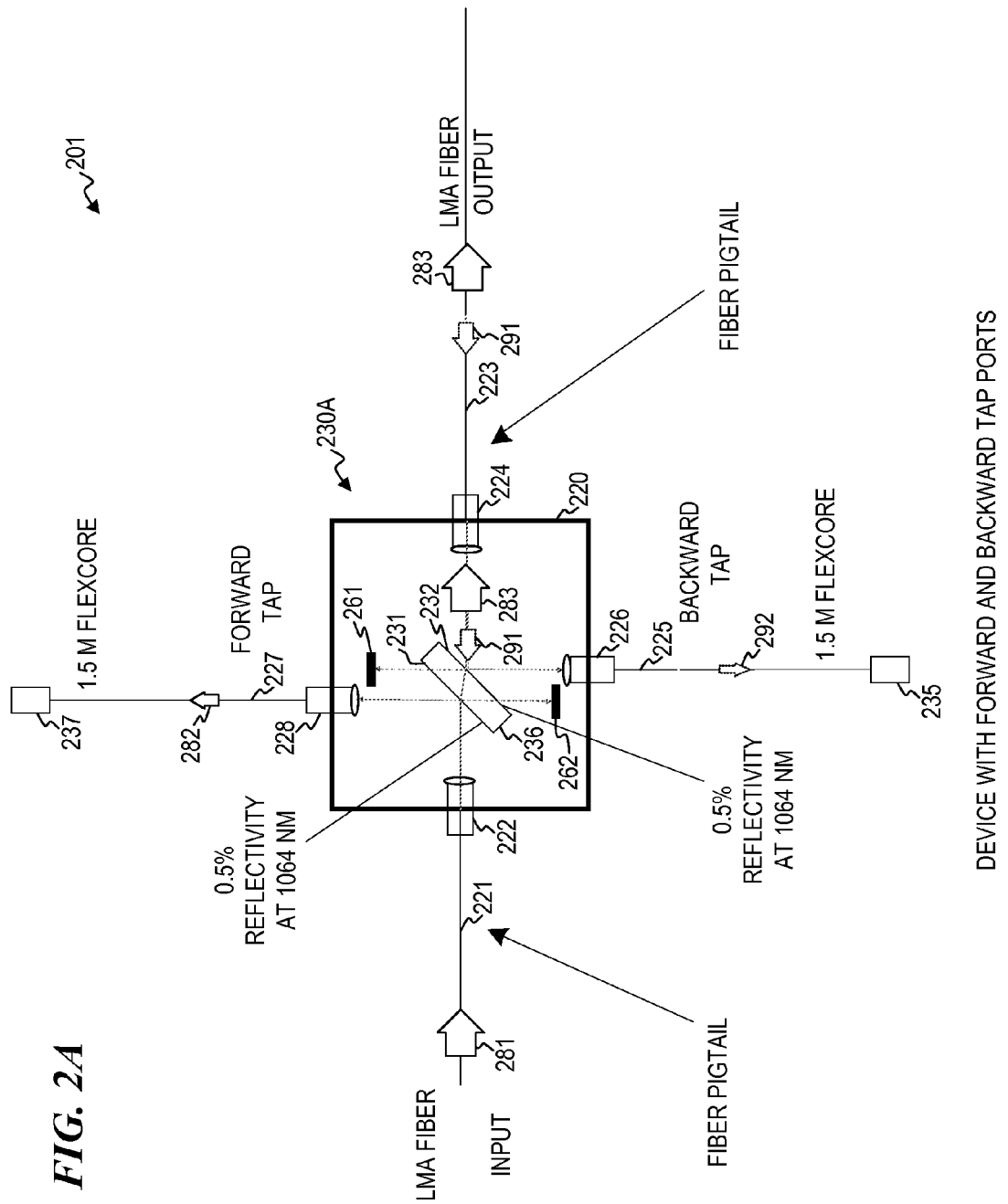
FIG. 2A is a schematic block diagram of a four-port beam-splitter assembly 201, according to some embodiments of the present invention.

FIG. 2A is a schematic block diagram of a four-port beam-splitter assembly 201, according to some embodiments of the present invention. In some embodiments, four-port beam-splitter assembly 201 is fabricated as an integral splitter assembly 230A with many of its parts sealed within an enclosure 220, but having a plurality of optical fibers attached to the assembly as optical interfaces. In some embodiments, an input fiber 221 (in some embodiments, this is a large-mode-area (LMA) fiber having a core diameter of at least 40 microns), an output fiber 223 (in some embodiments, this is a large-mode-area (LMA) fiber having a core diameter of at least 40 microns), a backward-tap fiber 225 (in some embodiments, this is single-mode (SM) fiber having a smaller core diameter than the diameter of the LMA fibers, e.g., in some embodiments, a core diameter between about 1 micron and about 25 microns, or between about 5 microns and about 10 microns), and a forward-tap fiber 227 (in some embodiments, this is single-mode (SM) fiber having a smaller core diameter than the diameter of the LMA fibers, e.g., in some embodiments, a core diameter between about 1 micron and about 25 microns, or between about 5 microns and about 10 microns), are attached to splitter assembly 230A. Thus, four-port beam-splitter assembly 201 includes splitter assembly 230A together with its input fiber 221 and its three output fibers 223, 225, and 227. In some embodiments, input fiber 221 is connected to a ferrule 222 having a lens (or other focusing element, such as a graded-index (GRIN) fiber element, hologram, or curved reflective surface) that collimates the light from fiber 221 into a collimated beam that propagates in free space to beam splitter 236.

In some embodiments, four-port beam-splitter assembly 201 has a partially reflective front surface 231 and a partially reflective back surface 232. In some embodiments of four-port beam-splitter assembly 201, partially reflective front surface 231 reflects about 0.5% of the input forward-propagating beam 281 from input fiber 221, which is reflected as forward-tap light 282 toward the lens (or other focusing element) of forward-tap ferrule 228, which in turn focuses the forward-tap light 282 into forward-tap fiber 227. In some embodiments, front surface 231 of beam splitter 236 transmits about 99.5% of the forward-propagating beam 281 toward the lens (or other focusing element) of ferrule 224, which focuses forward-propagating light 283 into output fiber 223. Ferrule 224 also collimates the backward-propagating beam 291 from fiber 223 into a collimated beam that propagates in free space to beam splitter 236. In some embodiments of four-port beam-splitter assembly 201, partially reflective back surface 232 of beam splitter 236 reflects about 0.5% of the backward-propagating beam 291 from output fiber 223 as reflected backward-tap light 292 toward the lens (or other focusing element) of backward-tap ferrule 226, which in turn focuses the backward-tap light 292 into backward-tap fiber 225.

In some embodiments, forward-tap fiber 227 is connected to an optical-fiber connector 237 that is then coupled to one or more sensors used to measure one or more characteristics of the forward-propagating beam (e.g., its power at a signal wavelength), and backward-tap fiber 225 is connected to an optical connector 235 that is then coupled to one or more sensors used to measure one or more characteristics of the backward-propagating beam (e.g., its power at a wavelength that is associated with SBS in a downstream gain fiber, its power at a wavelength that is associated with ASE in a downstream gain fiber, and/or its power at a signal wavelength that is associated with a back reflection of the output signal from a far end of a downstream delivery fiber). In some embodiments, due to multiple reflections, a beam dump (e.g., a black light-absorbing surface 261, shown in FIG. 2A) is located within enclosure 220 to collect forward-propagating light that is reflected from the back surface 232. In some embodiments, a beam dump (e.g., a black light-absorbing surface 262, also shown in FIG. 2A) is located within an enclosure 220 to collect backward-propagating light that is reflected from the front surface 231. In other embodiments (for example, see the description of FIG. 2B and FIG. 2C below), only one of the surfaces of beam splitter 236 (e.g., the front surface 231) is configured to reflect a desired proportion of light, while the other surface of beam splitter 236 (e.g., the back surface 232) coated with an anti-reflection coating so as not to reflect light, thus eliminating the need for a beam dump.

Figure 2B:
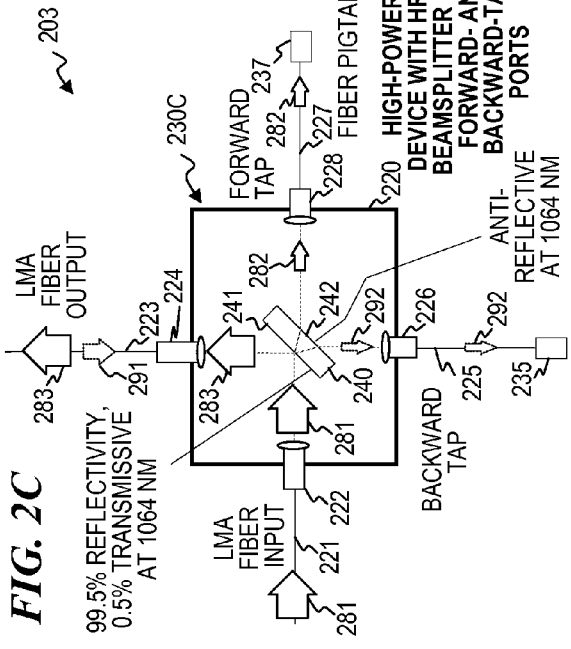
FIG. 2B is a schematic block diagram of an alternative four-port beam-splitter assembly 202, according to some embodiments of the present invention.

FIG. 2B is a schematic block diagram of an alternative four-port beam-splitter assembly 202, according to some embodiments of the present invention. In some embodiments, four-port beam-splitter assembly 202 is fabricated as an integral splitter assembly 230B with many of its parts sealed within an enclosure 220, and having a plurality of optical fibers attached to the assembly as optical interfaces. In some embodiments of each, at least some of the internal optical parts are laser-welded to a glass substrate within enclosure 220. In some embodiments, the four-port beam splitter is a high-power device with highly-transmissive (HT) beamsplitter with forward- and backward-tap ports, as shown in the schematic block diagram of FIG. 2B.

In some embodiments of each system described herein, at least some of the internal optical parts are laser-welded to a glass substrate within enclosure 220 or the other respective enclosures.

In other embodiments, each system described herein uses or is modified to use other percentages of transmitted and reflected light rather than the about 99.5% and about 0.5%, respectively described for the various beam splitters herein. For example, in some embodiments, the beam splitter transmits about 99.9% and reflects about 0.1% of the light. In some embodiments, the beam splitter transmits about 99.8% and reflects about 0.2% of the light. In some embodiments, the beam splitter transmits about 99.5% and reflects about 0.5% of the light. In some embodiments, the beam splitter transmits about 99% and reflects about 1% of the light. In some embodiments, the beam splitter transmits about 98% and reflects about 2% of the light. In some embodiments, the beam splitter transmits about 95% and reflects about 5% of the light. In some embodiments, the beam splitter transmits about 90% and reflects about 10% of the light. In some embodiments, the beam splitter transmits at least 99.9% and reflects less than 0.1% of the light. In some embodiments, the beam splitter transmits at least 99.8% and reflects less than 0.2% of the light. In some embodiments, the beam splitter transmits at least 99.5% and reflects less than 0.5% of the light. In some embodiments, the beam splitter transmits at least 99% and reflects less than 1% of the light. In some embodiments, the beam transmits at least 98% and reflects less than 2% of the light. In some embodiments, the beam splitter transmits about 95% and reflects about 5% of the light. In some embodiments, the beam splitter transmits at least 90% and reflects less than 10% of the light.

In some embodiments, beam splitter 233 has a highly-transmissive/partially-reflective front surface 234 and an anti-reflective back surface 235, which has the benefit of a reduced need for a beam dump. In some embodiments, the beam splitter 233 partially reflective front surface 234 reflects about 0.5% of the forward-propagating beam 281 from input fiber 221, reflecting forward-tap light 282 toward the lens (or other focusing element) of forward-tap ferrule 228, which focuses the forward-tap light 282 into forward-tap fiber 227, and front surface 234 transmits about 99.5% of the forward-propagating beam 281 to forward-propagating light 283 toward the lens (or other focusing element) of ferrule 224, which focuses the forward-propagating light 283 into fiber 223. In some embodiments, the beam splitter 233 partially reflective front surface 234 reflects about 0.5% of the backward-propagating beam 291 from output fiber 223 reflecting backward-tap light 292 toward the lens (or other focusing element) of backward-tap ferrule 226, which focuses the backward-tap light 292 into backward-tap fiber 225.

Figure 2C:
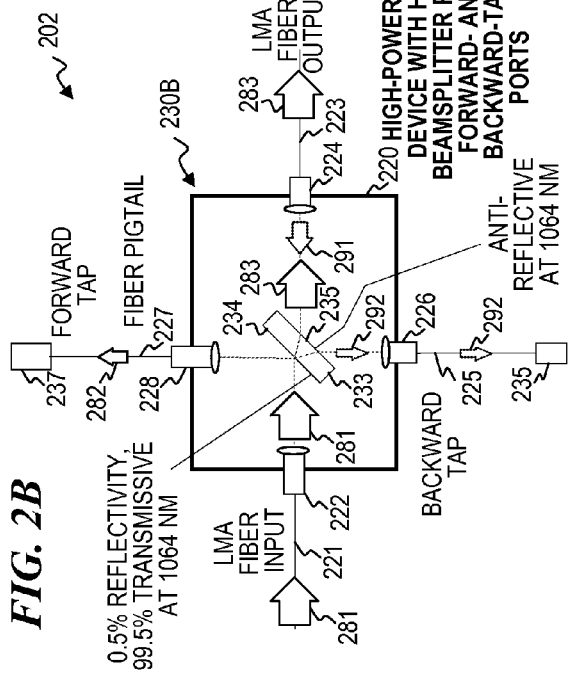
FIG. 2C is a schematic block diagram of another alternative four-port beam-splitter assembly 203, according to some embodiments of the present invention.

FIG. 2C is a schematic block diagram of another alternative four-port beam-splitter assembly 203, according to some embodiments of the present invention. In some embodiments, four-port beam-splitter assembly 203 is fabricated as an integral splitter assembly 230C with many of its parts sealed within an enclosure 220, and having a plurality of optical fibers attached to the assembly as optical interfaces. In some embodiments, the four-port beam splitter is a high-power device with highly-reflective low-transmissive (HR-LT) beamsplitter with forward- and backward-tap ports, as shown in the schematic block diagram of FIG. 2C.

In some embodiments, beam splitter 240 has a highly-reflective low-transmissive front surface 241 and an anti-reflective back surface 242, which has the benefit of a reduced need for a beam dump. In some embodiments, beam splitter 240 highly-reflective front surface 241 transmits about 0.5% of the forward-propagating beam 281 from input fiber 221 to forward-tap light 282 toward the lens (or other focusing element) of forward-tap ferrule 228, which focuses the forward-tap light 282 into forward-tap fiber 227, and front surface 241 reflects about 99.5% of the forward-propagating beam 281 to forward-propagating light 283 toward the lens (or other focusing element) of ferrule 224, which focuses the forward-propagating light 283 into fiber 223. Note that reflecting the high-power forward-propagating light has the advantage of minimizing the power of the light that goes through the beam splitter, which increases the power handling capability of the system. In some embodiments, the beam splitter 240 the partially reflective front surface 234 transmits about 0.5% of the backward-propagating beam 291 from output fiber 223 transmitting backward-tap light 292 toward the lens (or other focusing element) of backward-tap ferrule 226, which focuses the backward-tap light 292 into backward-tap fiber 225.

Figure 2D:
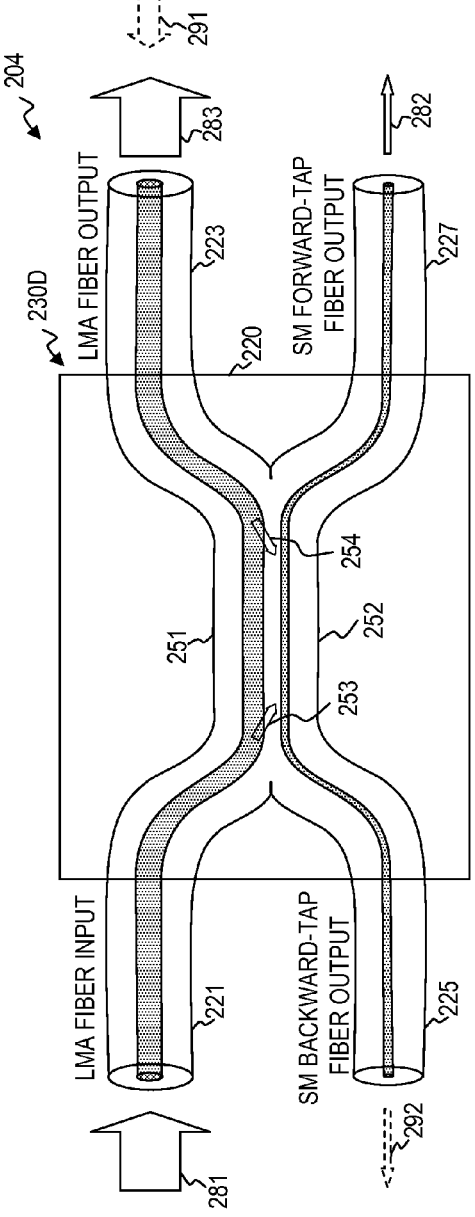
FIG. 2D is a schematic block diagram of yet another alternative four-port beam-splitter assembly 204, according to some embodiments of the present invention.

FIG. 2D is a schematic block diagram of yet another alternative four-port beam-splitter assembly 204, according to some embodiments of the present invention. In some embodiments, four-port beam-splitter assembly 204 is formed by fusing a middle portion 251 of a first source fiber 221-223 to a middle portion 252 of a second fiber 225-227 such that the cores are sufficiently close to one another but not touching, in order to form an evanescent coupling (which couples a portion 253 of the forward propagating signal 281 across into the core forward-tap fiber 227 as forward-tap light 282, and which couples a portion 254 of the backward-propagating light 291 across into the core backward-tap fiber 225 as backward-tap light 292), such that the input optical fiber 221 and the first output optical fiber 223 are two end portions of the first source fiber 221-223 at opposite sides of the middle portion 251 of the first source fiber 221-223, and the second output fiber 227 and the third output fiber 225 are two end portions of the second fiber 225-227 at opposite sides of the middle portion 252 of the second fiber 225-227. In some embodiments, four-port beam-splitter assembly 204 is fabricated as an integral splitter assembly 230D with many of its parts inherently sealed within enclosure 220, and having a plurality of optical fibers as optical interfaces. In other embodiments, the enclosure 220 of system 204 is omitted or consists of an opaque conformal coating across the fiber junction. In some embodiments, input fiber 221 (in some embodiments, this is a large-mode-area (LMA) fiber having a core diameter of at least 40 microns) and output fiber 223 (in some embodiments, this is an LMA fiber having a core diameter of at least 40 microns) are simply opposite ends of a single LMA fiber 221-223. Similarly, backward-tap fiber 225 (in some embodiments, this is single-mode (SM) fiber having a smaller core diameter than the diameter of the LMA fibers, e.g., in some embodiments, a core diameter between about 1 micron and about 25 microns, or between about 5 microns and about 10 microns), and forward-tap fiber 227 (in some embodiments, this is single-mode (SM) fiber having a smaller core diameter than the diameter of the LMA fibers, e.g., in some embodiments, a core diameter that is the same as backward-tap fiber 225) are also simply opposite ends of a single fiber 225-227. In some embodiments, this LMA fiber 221-223 and SMA fiber 225-227 are fused to one another as splitter assembly 230D. The resulting four-port beam-splitter assembly 204 appears functionally as splitter assembly 230D together with its input fiber 221 and its three output fibers 223, 225, and 227.

In some embodiments, four-port beam-splitter assembly 204 has a fused middle portion 251 of a first source fiber 221-223 that is fused to a fused middle portion 252 of a second fiber 225-227 to form an evanescent coupling. In some embodiments, the fusing of middle portion fiber 251 to middle portion 252 includes fusing the fiber cladding without fusing the fiber cores for a predetermined length, for example, by coupling a test signal into fiber end 221, and monitoring the forward-tap signal 282 while heating the central portion only until the cross-coupled output signal 282 reaches the desired proportion (e.g., until about (to a desired accuracy) 0.5% coupling is achieved). In some embodiments, the desired proportion cross-coupling output is about 10% coupling. In some embodiments, the desired proportion cross-coupling output is about 5% coupling. In some embodiments, the desired proportion cross-coupling output is about 2% coupling. In some embodiments, the desired proportion cross-coupling output is about 1% coupling. In some embodiments, the desired proportion cross-coupling output is about 0.5% coupling. In some embodiments, the desired proportion cross-coupling output is about 0.1% coupling. In some embodiments, the desired proportion cross-coupling output is about 0.05% coupling. In some embodiments, the desired proportion cross-coupling output is about 0.01% coupling. In some embodiments, the desired proportion cross-coupling output is less than about 10% coupling. In some embodiments, the desired proportion cross-coupling output is less than about 5% coupling. In some embodiments, the desired proportion cross-coupling output is less than about 2% coupling. In some embodiments, the desired proportion cross-coupling output is less than about 1% coupling. In some embodiments, the desired proportion cross-coupling output is less than about 0.5% coupling. In some embodiments, the desired proportion cross-coupling output is less than about 0.1% coupling. In some embodiments, the desired proportion cross-coupling output is less than about 0.05% coupling. In some embodiments, the desired proportion cross-coupling output is less than about 0.01% coupling.

In some embodiments, the four-port beam-splitter assembly 204 partially couples the forward-propagating beam 281 from input fiber 221 to forward-tap light 282. In some embodiments, the four-port beam-splitter assembly 204 couples substantially all of the remainder of the forward-propagating beam 281 from input fiber 221 to output fiber 223 as forward-propagating light 283. In some embodiments, four-port beam-splitter assembly 204 partially couples backward-propagating beam 291 from output fiber 223 to backward-tap light 292. In some embodiments, (such as shown) no couplers are needed, but rather the fibers form an all-glass optical path. In some other embodiments, forward-tap fiber 227 is connected to an optical-fiber connector (such as connector 237 shown in FIG. 2A) that is then coupled to one or more sensors used to measure one or more characteristics of the forward-propagating beam (e.g., its power), and backward-tap fiber 225 is connected to an optical connector (such as connector 235 shown in FIG. 2A) that is then coupled to one or more sensors used to measure one or more characteristics of the backward-propagating beam (e.g., its power at a wavelength that is associated with SBS in a downstream gain fiber, its power at a wavelength that is associated with ASE in a downstream gain fiber, and/or its power at a signal wavelength that is associated with a back reflection from a far end of a downstream delivery fiber).

FIG. 2E is a schematic block diagram of a laser system 205, according to a second embodiment of the present invention. In some embodiments, system 205 of FIG. 2E includes a single device 230 (e.g., integral splitter assembly 230A of FIG. 2A, 230B of FIG. 2B, 230C of FIG. 2C, or 230D of FIG. 2D) that allows simultaneous analysis of forward-propagating and backward-propagating signals in a fiber-optic system. In some embodiments, system 205 of FIG. 2E includes 2-port isolator 122 to prevent backward-propagating light (e.g., backward-propagating SBS and backward-propagating ASE) from feeding back into the seed laser. An important application is in high-power MOPA (master-oscillator power-amplifier) architectures where simultaneous monitoring of the forward-propagating seed signal, the backward-propagating SBS and backward-propagating ASE is important for both amplifier performance and operational safety. Some benefits of system 205 of this second embodiment of the present invention include its being a diagnostic device for measuring both SBS level and ASE level. In addition, the forward-propagating signal level (its power) can be measured. Further, the backward-propagating light and forward-propagating light are both coupled into single-mode (SM) fibers. The spectral resolution obtained by an optical-spectrum analyzer using the SM fibers of the second embodiment is higher than that of the first embodiment using multimode fibers.

In some embodiments, the forward-tap electrical signal(s) 127 (from forward tap sensor(s) 126 and representing one or more certain properties of the forward-propagating light) and the backward-tap electrical signal(s) 125 (from backward-tap sensor(s) 124 and representing one or more certain properties of the backward-propagating light) are coupled to controller 130 that is used to control one or more operations of system 205 (e.g., in some embodiments, controller 130 can turn off the electrical power to the pump lasers 142 via electrical control or power line(s) 132, and/or can alter the operation of the seed source 110 via electrical control or power line(s) 131 (e.g., in some embodiments, if the backward tap 225 and sensors 124 indicate a buildup of excess ASE power from gain fiber 147 (e.g., perhaps caused by a lack of seed-signal pulses that would normally use up the optical pump power), controller 130 can force the seed source 110 to emit a continuous-wave (CW) signal that would bleed the excess stored energy from the gain fiber).

FIG. 3A is a schematic block diagram of a four-port isolating beam-splitter assembly 301 according to some embodiments of the present invention. In some embodiments, beam-splitter assembly 301 is substantially equal to beam-splitter assembly 201 of FIG. 2A but with the addition of an opto-isolator 322 between ferrule 222 and beam splitter 236 (in other embodiments, the isolator may be placed in other locations along the optical signal path, but when in the location shown here, it isolates not only reflections from the output fiber 223 but also possible reflections from the forward-tap path to fiber 227). Opto-isolator 322 acts substantially equal 2-port isolator 122 in FIG. 2E; preventing backward-propagating light (e.g., backward-propagating SBS and backward-propagating ASE) from feeding back into the seed laser. In this embodiment, opto-isolator 322 is included in integral splitter assembly 330A. In some embodiments, four-port isolating beam-splitter assembly 301 is fabricated as an integral splitter assembly 330A with many of its parts sealed within an enclosure 320, but having a plurality of optical fibers attached to the assembly as optical interfaces. In some embodiments, an input fiber 221 (in some embodiments, this is a large-mode-area (LMA) fiber having a core diameter of at least 40 microns), an output fiber 223 (in some embodiments, this is a large-mode-area (LMA) fiber having a core diameter of at least 40 microns), a backward-tap fiber 225 (in some embodiments, this is single-mode (SM) fiber having a smaller core diameter than the diameter of the LMA fibers, e.g., in some embodiments, a core diameter between about 1 micron and about 25 microns, or between about 5 microns and about 10 microns), and a forward-tap fiber 227 (in some embodiments, this is single-mode (SM) fiber having a smaller core diameter than the diameter of the LMA fibers, e.g., in some embodiments, a core diameter between about 1 micron and about 25 microns, or between about 5 microns and about 10 microns), are attached to splitter assembly 330A. Thus, four-port isolating beam-splitter assembly 301 includes splitter assembly 330A together with its input fiber 221 and its three output fibers 223, 225, and 227. In some embodiments, input fiber 221 is connected to a ferrule 222 having a lens (or other focusing element, such as a graded-index (GRIN) fiber element, hologram, or curved reflective surface) that collimates the light from fiber 221 into a collimated beam 281 that propagates in free space to isolator 322 and then to beam splitter 236.

In some embodiments, four-port beam-splitter assembly 301 has a partially reflective front surface 231 and a partially reflective back surface 232. In some embodiments of four-port beam-splitter assembly 301, partially reflective front surface 231 reflects about 0.5% of the input forward-propagating beam 281 from input fiber 221, which is reflected as forward-tap light 282 toward the lens (or other focusing element) of forward-tap ferrule 228, which in turn focuses the forward-tap light 282 into forward-tap fiber 227. In some embodiments, front surface 231 of beam splitter 236 transmits about 99.5% of the forward-propagating beam 281 toward the lens (or other focusing element) of ferrule 224, which focuses forward-propagating light 283 into output fiber 223. Ferrule 224 also collimates the backward-propagating beam 291 from fiber 223 into a collimated beam that propagates in free space to beam splitter 236. In some embodiments of four-port beam-splitter assembly 301, partially reflective back surface 232 of beam splitter 236 reflects about 0.5% of the backward-propagating beam 291 from output fiber 223 as reflected backward-tap light 292 toward the lens (or other focusing element) of backward-tap ferrule 226, which in turn focuses the backward-tap light 292 into backward-tap fiber 225.

In some embodiments, forward-tap fiber 227 is connected to an optical-fiber connector 237 that is then coupled to one or more sensors used to measure one or more characteristics of the forward-propagating beam (e.g., its power at a signal wavelength), and backward-tap fiber 225 is connected to an optical connector 235 that is then coupled to one or more sensors used to measure one or more characteristics of the backward-propagating beam (e.g., its power at a wavelength that is associated with SBS in a downstream gain fiber, its power at a wavelength that is associated with ASE in a downstream gain fiber, and/or its power at a signal wavelength that is associated with a back reflection of the output signal from a far end of a downstream delivery fiber). In some embodiments, due to multiple reflections, a beam dump (e.g., a black light-absorbing surface, not shown in FIG. 3A, but in a position corresponding to beam dump 261 of FIG. 2A) is located within enclosure 220 to collect forward-propagating light that is reflected from the back surface 232. In some embodiments, a beam dump (e.g., a black light-absorbing surface, also not shown in FIG. 3A, but in a position corresponding to beam dump 262 of FIG. 2A) is located within an enclosure 320 to collect backward-propagating light that is reflected from the front surface 231. In other embodiments (for example, see the description of FIG. 3B and FIG. 3C below), only one of the surfaces of beam splitter 236 (e.g., the front surface) is configured to reflect a desired proportion of light, while the other surface of beam splitter 236 (e.g., the back surface) coated with an anti-reflection coating so as not to reflect light, thus eliminating the need for a beam dump.

FIG. 3B is a schematic block diagram of an alternative four-port isolating beam-splitter assembly 302 according to some embodiments of the present invention. In some embodiments, beam-splitter assembly 302 is substantially equal to beam-splitter assembly 202 of FIG. 2B but with the addition of an opto-isolator 322 between ferrule 222 and beam splitter 233. Opto-isolator 322 acts substantially equal 2-port isolator 122 in FIG. 2E; preventing backward-propagating light (e.g., backward-propagating SBS and backward-propagating ASE) from feeding back into the seed laser. In this embodiment, opto-isolator 322 is included in integral splitter assembly 330B. In some embodiments, four-port beam-splitter assembly 302 is fabricated as an integral splitter assembly 330B with many of its parts sealed within an enclosure 320, and having a plurality of optical fibers attached to the assembly as optical interfaces. In some embodiments of each, at least some of the internal optical parts are laser-welded to a glass substrate within enclosure 320. In some embodiments, the four-port beam splitter is a high-power device with highly-transmissive (HT) beamsplitter with forward- and backward-tap ports, as shown in the schematic block diagram of FIG. 3B.

In some embodiments of each system described herein, at least some of the internal optical parts are laser-welded to a glass substrate within enclosure 320 or the other respective enclosures.

In other embodiments, each system described herein uses other percentages of transmitted and reflected light rather than the about 99.5% and about 0.5%, respectively described for the systems herein. For example, in some embodiments, the beam splitter transmits about 99.9% and reflects about 0.1% of the light. In some embodiments, beam splitter transmits about 99% and reflects about 1% of the light. In some embodiments, beam splitter transmits about 90% and reflects about 10% of the light. In some embodiments, beam splitter transmits at least 99.5% and reflects less than 0.5% of the light. In some embodiments, beam splitter transmits at least 99.9% and reflects less than 0.1% of the light. In some embodiments, beam transmits at least 99% and reflects less than 1% of the light. In some embodiments, beam splitter transmits at least 90% and reflects less than 10% of the light.

In some embodiments, beam splitter 233 has a highly-transmissive/partially-reflective front surface 234 and an anti-reflective back surface 235, which has the benefit of a reduced need for a beam dump. In some embodiments, the beam splitter 233 partially reflective front surface 234 reflects about 0.5% of the forward-propagating beam 281 from input fiber 221, reflecting forward-tap light 282 toward the lens (or other focusing element) of forward-tap ferrule 228, which focuses the forward-tap light 282 into forward-tap fiber 227, and front surface 234 transmits about 99.5% of the forward-propagating beam 281 to forward-propagating light 283 toward the lens (or other focusing element) of ferrule 224, which focuses the forward-propagating light 283 into fiber 223. In some embodiments, the beam splitter 233 partially reflective front surface 234 reflects about 0.5% of the backward-propagating beam 291 from output fiber 223 reflecting backward-tap light 292 toward the lens (or other focusing element) of backward-tap ferrule 226, which focuses the backward-tap light 292 into backward-tap fiber 225.

FIG. 3C is a schematic block diagram of another alternative four-port beam-splitter assembly 303, according to some embodiments of the present invention. In some embodiments, beam-splitter assembly 303 is substantially equal to beam-splitter assembly 203 of FIG. 2C but with the addition of an opto-isolator 322 between ferrule 222 and beam splitter 240. Opto-isolator 322 acts substantially equal 2-port isolator 122 in FIG. 2E; preventing backward-propagating light (e.g., backward-propagating SBS and backward-propagating ASE) from feeding back into the seed laser. In this embodiment, opto-isolator 322 is included in integral splitter assembly 330C. In some embodiments, four-port beam-splitter assembly 303 is fabricated as an integral splitter assembly 330C with many of its parts sealed within an enclosure 320, and having a plurality of optical fibers attached to the assembly as optical interfaces. In some embodiments, the four-port beam splitter is a high-power device with highly-reflective low-transmissive (HR-LT) beamsplitter with forward- and backward-tap ports, as shown in the schematic block diagram of FIG. 3C.

In some embodiments, beam splitter 240 has a highly-reflective low-transmissive front surface 241 and an anti-reflective back surface 242, which has the benefit of a reduced need for a beam dump. In some embodiments, beam splitter 240 highly-reflective front surface 241 transmits about 0.5% of the forward-propagating beam 281 from input fiber 221 to forward-tap light 282 toward the lens (or other focusing element) of forward-tap ferrule 228, which focuses the forward-tap light 282 into forward-tap fiber 227, and front surface 241 reflects about 99.5% of the forward-propagating beam 281 to forward-propagating light 283 toward the lens (or other focusing element) of ferrule 224, which focuses the forward-propagating light 283 into fiber 223. Note that reflecting the high-power forward-propagating light has the advantage of minimizing the power of the light that goes through the beam splitter, which increases the power handling capability of the system. In some embodiments, the beam splitter 240 the partially reflective front surface 234 transmits about 0.5% of the backward-propagating beam 291 from output fiber 223 transmitting backward-tap light 292 toward the lens (or other focusing element) of backward-tap ferrule 226, which focuses the backward-tap light 292 into backward-tap fiber 225.

In other embodiments, each system described herein uses other percentages of reflected and transmitted light rather than the about 99.5% and about 0.5%, respectively described for the systems herein. For example, in some embodiments, the beam splitter reflects about 99.9% and transmits about 0.1% of the light. In some embodiments, the beam splitter reflects about 99% and transmits about 1% of the light. In some embodiments, the beam splitter reflects about 90% and transmits about 10% of the light. In some embodiments, the beam splitter reflects at least about 99.5% and transmits less than about 0.5% of the light. In some embodiments, the beam splitter reflects at least about 99.9% and transmits less than about 0.1% of the light. In some embodiments, the beam splitter reflects at least about 99% and transmits less than about 1% of the light. In some embodiments, the beam splitter reflects at least about 90% and transmits less than about 10% of the light.

FIG. 3D is a schematic block diagram of yet another alternative four-port beam-splitter assembly 304, according to some embodiments of the present invention. In some embodiments, beam-splitter assembly 304 is substantially equal to beam-splitter assembly 204 of FIG. 2D but with the addition of an opto-isolator 322 before input fiber 221. Opto-isolator 322 acts substantially equal 2-port isolator 122 in FIG. 2E; preventing backward-propagating light (e.g., backward-propagating SBS and backward-propagating ASE) from feeding back into the seed laser. In this embodiment, opto-isolator 322 is included in integral splitter assembly 330D. In some embodiments, four-port beam-splitter assembly 304 is formed by fusing a middle portion 251 of a first source fiber 221-223 to a middle portion 252 of a second fiber 225-227 such that the cores are sufficiently close to one another but not touching, in order to form an evanescent coupling (which couples a portion 253 of the forward propagating signal 281 across into the core forward-tap fiber 227 as forward-tap light 282, and which couples a portion 254 of the backward-propagating light 291 across into the core backward-tap fiber 225 as backward-tap light 292), such that the input optical fiber 221 and the first output optical fiber 223 are two end portions of the first source fiber 221-223 at opposite sides of the middle portion 251 of the first source fiber 221-223, and the second output fiber 227 and the third output fiber 225 are two end portions of the second fiber 225-227 at opposite sides of the middle portion 252 of the second fiber 225-227. In some embodiments, four-port beam-splitter assembly 304 is fabricated as an integral splitter assembly 330D with many of its parts inherently sealed within enclosure 320, and having a plurality of optical fibers as optical interfaces. In other embodiments, the enclosure 320 of beam-splitter assembly 304 is omitted or consists of an opaque conformal coating across the fiber junction. In some embodiments, input fiber 221 (in some embodiments, this is a large-mode-area (LMA) fiber having a core diameter of at least 40 microns) and output fiber 223 (in some embodiments, this is an LMA fiber having a core diameter of at least 40 microns) are simply opposite ends of a single LMA fiber 221-223. Similarly, backward-tap fiber 225 (in some embodiments, this is single-mode (SM) fiber having a smaller core diameter than the diameter of the LMA fibers, e.g., in some embodiments, a core diameter between about 1 micron and about 25 microns, or between about 5 microns and about 10 microns), and forward-tap fiber 227 (in some embodiments, this is single-mode (SM) fiber having a smaller core diameter than the diameter of the LMA fibers, e.g., in some embodiments, a core diameter that is the same as backward-tap fiber 225)) are also simply opposite ends of a single fiber 225-227. In some embodiments, this LMA fiber 221-223 and SMA fiber 225-227 are fused to one another as splitter assembly 330D. The resulting four-port beam-splitter assembly 304 appears functionally as splitter assembly 330D together with its input fiber 221 and its three output fibers 223, 225, and 227.

In some embodiments, four-port beam-splitter assembly 304 has a fused middle portion 251 of a first source fiber 221-223 that is fused to a fused middle portion 252 of a second fiber 225-227 to form an evanescent coupling. In some embodiments, the fusing of middle portion fiber 251 to middle portion 252 includes fusing the fiber cladding without fusing the fiber cores for a predetermined length, for example, by coupling a test signal into fiber end 221, and monitoring the forward-tap signal 282 while heating the central portion only until the cross-coupled output signal 282 reaches the desired proportion (e.g., until about 0.5% coupling (to a desired accuracy) is achieved). In some embodiments, the four-port beam-splitter assembly 304 partially couples the forward-propagating beam 281 from input fiber 221 to forward-tap light 282. In some embodiments, the four-port beam-splitter assembly 304 couples substantially the remainder of the forward-propagating beam 281 from input fiber 221 to output fiber 223 as forward-propagating light 283. In some embodiments, four-port beam-splitter assembly 304 partially couples backward-propagating beam 291 from output fiber 223 to backward-tap light 292. In some embodiments (such as shown), no couplers are needed, but rather the fibers form an all-glass optical path. In some other embodiments, forward-tap fiber 227 is connected to an optical-fiber connector (such as connector 237 shown in FIG. 2A) that is then coupled to one or more sensors used to measure one or more characteristics of the forward-propagating beam (e.g., its power), and backward-tap fiber 225 is connected to an optical connector (such as connector 235 shown in FIG. 3A) that is then coupled to one or more sensors used to measure one or more characteristics of the backward-propagating beam (e.g., its power at a wavelength that is associated with SBS in a downstream gain fiber, its power at a wavelength that is associated with ASE in a downstream gain fiber, and/or its power at a signal wavelength that is associated with a back reflection from a far end of a downstream delivery fiber).

Figure 3E:
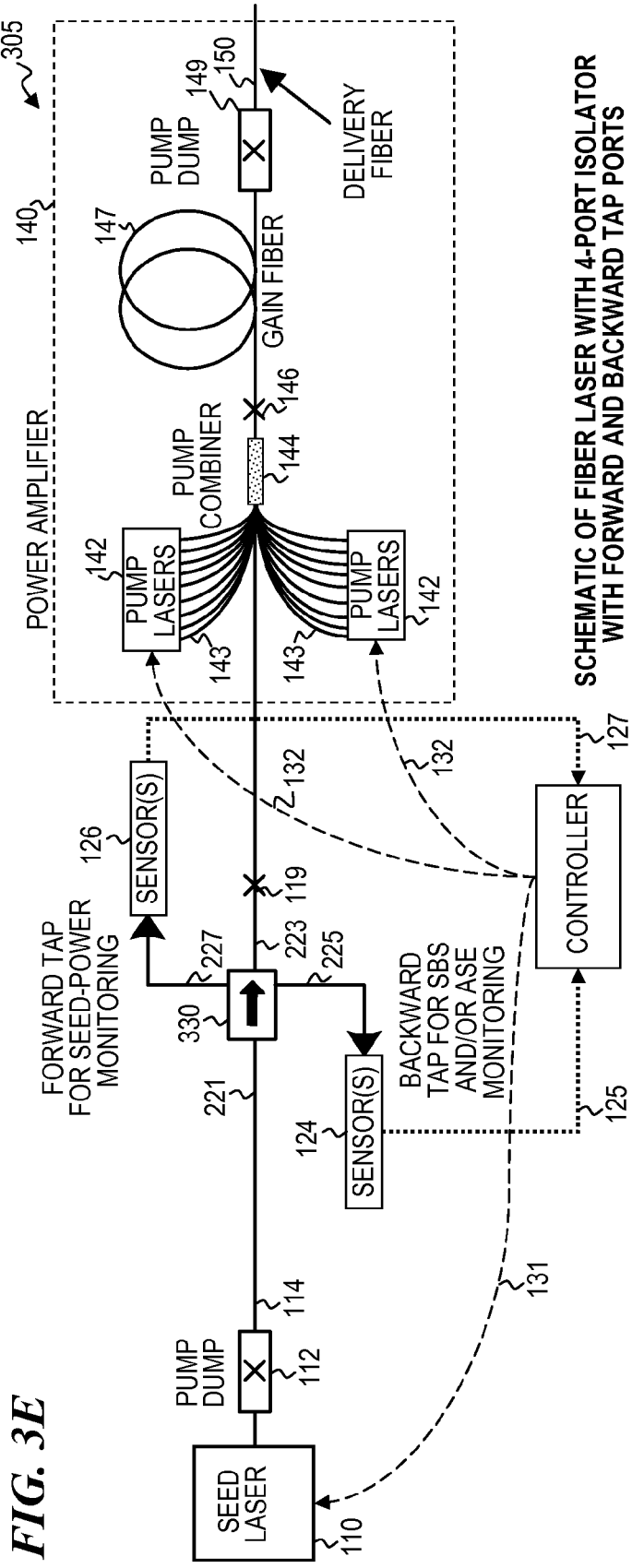
FIG. 3E is a schematic block diagram of a laser system 305, according to some embodiments of the present invention.

FIG. 3E is a schematic block diagram of a laser system 305, according to a third embodiment of the present invention. In some embodiments, system 305 is substantially equal to system 205 of FIG. 2D but with the addition of an opto-isolator 322 included in a single device 330 (e.g., integral splitter assembly 330A of FIG. 3A, 330B of FIG. 3B, 330C of FIG. 3C, or 330D of FIG. 3D) that allows simultaneous analysis of forward-propagating and backward-propagating signals in a fiber-optic system. In this embodiment, system 305 of FIG. 3E includes 2-port isolator 122 to prevent backward-propagating light (e.g., backward-propagating SBS and backward-propagating ASE) from feeding back into the seed laser. An important application is in high-power MOPA (master-oscillator power-amplifier) architectures where simultaneous monitoring of the forward-propagating seed signal, the backward-propagating SBS and backward-propagating ASE is important for both amplifier performance and operational safety. Some benefits of system 305 of this third embodiment of the present invention include its being a diagnostic device for measuring both SBS level and ASE level. In addition, the forward-propagating signal level (its power) can be measured. Further, the backward-propagating light and forward-propagating light are both coupled into single-mode (SM) fibers. The spectral resolution obtained by an optical-spectrum analyzer using the SM fibers of the second embodiment is higher than that of the first embodiment using multimode fibers.

In some embodiments, the forward-tap electrical signal(s) 127 (from forward tap sensor(s) 126 and representing one or more certain properties of the forward-propagating light) and the backward-tap electrical signal(s) 125 (from backward-tap sensor(s) 124 and representing one or more certain properties of the backward-propagating light) are coupled to controller 130 that is used to control one or more operations of system 305 (e.g., in some embodiments, controller 130 can turn off the electrical power to the pump lasers 142 via electrical control or power line(s) 132, and/or can alter the operation of the seed source 110 via electrical control or power line(s) 131 (e.g., in some embodiments, if the backward tap 225 and sensors 124 indicate a buildup of excess ASE power from gain fiber 147 (e.g., perhaps caused by a lack of seed-signal pulses that would normally use up the optical pump power), controller 130 can force the seed source 110 to emit a continuous-wave (CW) signal that would bleed the excess stored energy from the gain fiber).

FIG. 3A through FIG. 3E show an optical system where a 4-port isolator is used. This embodiment of the device provides forward and backward taps incorporated into a fiber-optic isolator package. There is no change in the utility of the taps of the device when included within an isolator and this is one preferred embodiment. Benefits of this third embodiment of the present invention include a reduction in the number of splices and a reduction in the size of the laser system (it is more compact). The third embodiment provides a diagnostic device for measuring both SBS and ASE levels. In addition, the forward-propagating signal level can be measured. This configuration provides a single device that offers power monitoring in both the forward and backward directions, and also provides optical isolation (optical isolation permits propagation in the forward direction while inhibiting propagation in the backward direction). This configuration also provides a compact geometry for multiple functions, and due to the integration of multiple functions in a single package, the number of optical-fiber splices and lengths of fiber along the laser-beam path are reduced as compared to the second embodiment. The backward-propagating light and forward-propagating light are both coupled into respective single-mode (SM) fibers. As a result, the spectral resolution obtained in an optical-spectrum analyzer coupled to these SM fibers is higher than that of the first embodiment described above.

In some versions of the first embodiment (see FIG. 1), an inline optical-power meter is used for measuring the forward-signal power. This device is located behind the isolator so that any backward-propagating light from the fiber amplifier does not contribute (unintentionally) to the power that is measured and/or recorded. In some embodiments, one of multimode pump-combiner legs is used for monitoring the SBS and ASE power in the backward direction. The coupling ratio into the pump-combiner legs can potentially be different for each pump leg, as well as for each different pump combiner. Therefore, in some embodiments, the amount or proportion of power that propagates into each pump-combiner leg is calibrated relative to the total backward-propagating power the core of the single output fiber of the pump combiner. This calibration can be done before attaching a gain fiber to the input end of the pump combiner by injecting light in the backward direction into the combiner and measuring the amount of light emitted from each pump-light input leg of the pump combiner. Because the proportion of backward-propagating light in each leg is typically different and each pump combiner is different, such measurements allow the manufacturer to select the one particular leg of each combiner that provides a proportion of light that is closest to some predetermined level. For example, Table 1 below presents some cases where a plurality of fiber pump combiners had legs with the various listed backward-propagating proportions:

TABLE 1

|  | Pump combiner 1 | Pump combiner 2 | Pump combiner 3 | Pump combiner 4 |
| --- | --- | --- | --- | --- |
| Leg 1 | 0.08 | 0.06 | 0.07 | 0.07 |
| Leg 2 | 0.12 | 0.13 | 0.07 | 0.07 |
| Leg 3 | 0.09 | 0.08 | 0.12 | 0.09 |
| Leg 4 | 0.10 | 0.12 | 0.14 | 0.14 |
| Leg 5 | 0.08 | 0.12 | 0.11 | 0.13 |
| Leg 6 | 0.12 | 0.08 | 0.12 | 0.12 |
| Leg 7 | 0.13 | 0.09 | 0.13 | 0.13 |
| Leg 8 | 0.10 | 0.09 | 0.08 | 0.07 |
| Leg 9 | 0.07 | 0.13 | 0.08 | 0.09 |
| Leg 10 | 0.11 | 0.10 | 0.08 | 0.09 |
| Selected leg and calibration factor | Leg 4 * 100% | Leg 10 * 100% | Leg 5 * 90.9% | Leg 3 * 111% |

In some embodiments, for each pump combiner, a leg having a proportion that is closest to the average value is selected, and optionally a calibration factor is applied (the signal is multiplied by a factor that provides a specified constant value regardless of the actual proportion going to the selected leg). For example, in the above table: for the first pump combiner, leg 4 is selected with a calibration factor of 100%, for the second pump combiner, leg 10 is selected with a calibration factor of 100%, for the third pump combiner, leg 5 is selected with a calibration factor of 100%, and for the fourth pump combiner, leg 3 is selected with a calibration factor of 111%. In each case, a pump-combiner leg having about 0.1 of the backward-propagating light is selected, and if the leg has less than 0.1, its sensed signal is increased by an amount that results in a desired constant proportion value (e.g., 0.1) while if the leg has more than 0.1, its sensed signal is decreased by an amount that results in the same desired constant proportion value (e.g., 0.1). In other embodiments, the leg having a proportion value closest to the desired proportion is selected and no calibration factor is applied. In yet other embodiments, only one leg is measured and its output is calibrated such that for a given backward-propagating signal, the measured signal is adjusted to match the desired calibrated value. For example, in some embodiments, for the pump combiners in the above table, the first leg of each pump combiner is selected and then measured and calibrated such that the calibration yields a constant (e.g., 0.1). Thus, pump combiner 1 leg 1 has a calibration factor of 125% (0.8*125%=0.1), pump combiner 2 leg 1 has a calibration factor of 167% (0.6*166.67%=0.1), pump combiner 3 leg 1 has a calibration factor of 142.86% (0.7*142.86%=0.1), and pump combiner 4 leg 1 has a calibration factor of 142.86% (0.7*142.86%=0.1). With a calibration factor applied, only one leg of each pump combiner need be measured and calibrated, saving time and cost in the manufacturing process.

In some of the second and third embodiments of the invention, a partially reflective, partially transmissive mirror is inserted inside a discrete fiber pigtailed package or inside an isolator package, respectively, immediately before the output-fiber collimator, as shown in FIG. 2B and FIG. 3B. The reflectivity of the two surfaces of the partial reflector can be specified (e.g., perhaps to different values) for the desired tap-coupling ratios. The partial mirror reflects the forward-propagating light into the forward-tap port and the backward-propagating light into the backward-tap port. In various embodiments, the partial mirror is oriented at any desired angle with respect to the beam path; however, in some embodiments, an orientation at 45 degrees to the beam-propagation direction is preferred.

In some embodiments, for a polarized signal in the forward direction, the forward signal will be linearly polarized. However, the backward-propagating signal from the amplifier can be randomly polarized. As a result, in some embodiments, the coatings of the partial reflector should have the same reflectivity for both s- and p-polarization light at the angle of operation (e.g., 45 degrees).

In some embodiments of the systems shown in FIG. 1, FIG. 2E, and FIG. 3E, one measurement of the forward-propagating signal is performed by splicing an inline fiber photodetector (for example, such as shown in FIG. 1). In some embodiments, the photodetector measures the power level only, and does not provide spectral information. Thus, in some embodiments, of the systems shown in FIG. 2E and FIG. 3E, the forward tap from the beamsplitter is used to provide a signal suitable for measuring spectral information. The backward-propagating SBS signal is monitored from one of the legs of the pump combiner that follows the isolator, if a spare pump-combiner leg is made available.

Figure 4:
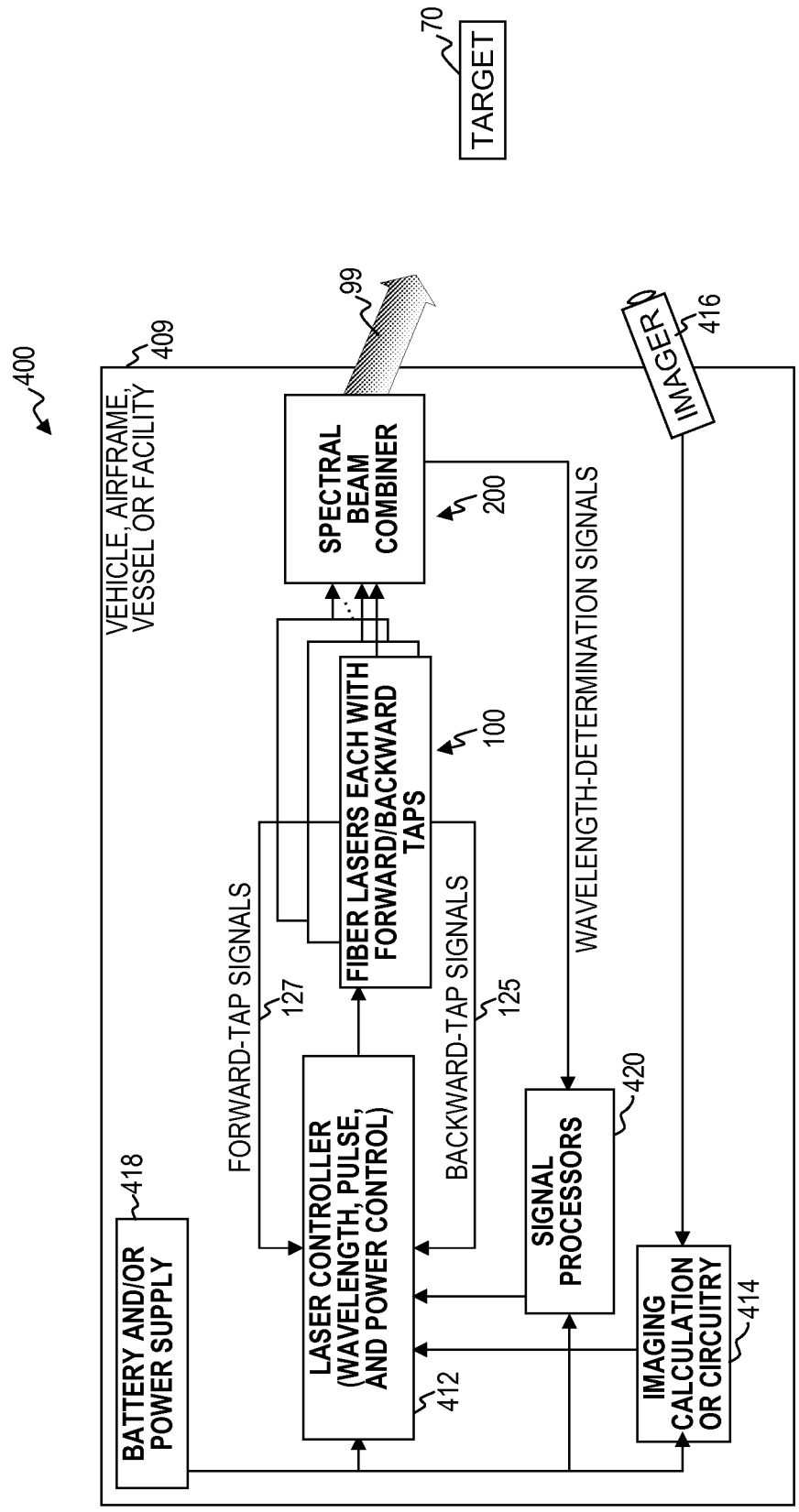
FIG. 4 is a block diagram of a high-power-fiber-laser control system 400 using one or more of the forward-tap backward-tap fiber-laser systems 100 as described herein.

FIG. 4 is a block diagram of a high-power-fiber-laser control system 400 using one or more of the forward-tap backward-tap fiber-laser systems 100 as described herein. FIG. 4 is a block diagram of a high-power spectral-beam-combining (SBC)-fiber-laser control system in an overall product 400 (e.g., a vehicle such as a land vehicle (such as a tank or remotely-operated robotic vehicle), airframe (such as a helicopter or jet airplane), vessel (such as a frigate, destroyer or aircraft carrier) or facility (such as an airport or bunker)) using one or more of the SBC-fiber-laser systems as described herein. In some embodiments, system 400 includes the vehicle, airframe, vessel or facility enclosure 409 and its other contents (e.g., engines and control systems), one or more battery and/or electrical power supplies 418, a laser controller 412 that provides the control of wavelength, pulse timing and duration for embodiments using pulse signals (other embodiments use CW (continuous wave) signal beams), output-power control, direction control of the output beam and the like, an imaging calculation microprocessor and/or circuitry 414 that obtains an image signal from imager 416 and calculates such data as target location and velocity that is then delivered to laser controller 412, signal processors 420 that receive wavelength-determination signals and/or directional-drift signals from the SBC (spectral beam combiner) module 200 (with its associated wavelength-, beam-off-axis and beam-off-angle detection sensors and circuitry, as described in U.S. Pat. No. 7,199,924 issued Apr. 3, 2007 to Andrew J. W. Brown et al., titled "Apparatus and method for spectral-beam combining of high-power fiber lasers," which is incorporated herein by reference), and that delivers wavelength-correction control data to laser controller 412. In some embodiments, laser controller 412 generates the control and power signals that are based at least in part on forward-tap signals 127 and backward-tap signals 125. In some embodiments, laser controller 412 generates the control and power signals that are sent to fiber-laser module 100, which then delivers high-power optical beams at a plurality of different wavelengths to SBC 200, which then combines the laser beams into a single multi-wavelength output laser SBC beam 99 that is directed toward target 70 (e.g., a hostile aircraft or spacecraft), according to the control information that was generated based on image information obtained from imager 416. In some embodiments, system 400 is part of, and used as an element of, a directed-energy (DE) weapon carried by a vehicle 409 (such as a tank, an aircraft, or a naval vessel).

In some embodiments, the Yb-doped pump lasers (e.g., gain fibers of fiber-laser module(s) 100 of FIG. 4) each outputting CW beams and each having continuous power levels of 1 kW or more, and when Raman shifted, the CW light outputs of fiber lasers 100 each approach or exceed 100 watts (W) at wavelengths of 1350 nm to 1500 nm (in some embodiments, other wavelength ranges are used). In other embodiments, the Yb-doped pump lasers (e.g., gain fibers fiber-laser module(s) 100 of FIG. 4) each output individual pulses having peak power levels of 1 MW or more, and when Raman shifted, the pulsed light outputs of fiber lasers 100 each approach or exceed 100 kilowatts (kW) at wavelengths of 1350 nm to 1500 nm (in some embodiments, other wavelength ranges are used). In some embodiments, laser controller 412 causes pulses of the laser beams to be in synchrony with one another such that the pulsed output 99 (which includes a series of pulses) approaches one megawatt or more of directed pulsed energy. In some embodiments, pulsed output 99 includes the pulsed power of a plurality of fiber lasers such that a light pulse in output 99 is between 1.001 kilowatts (kW) and 10 kW (inclusive of both end values of the range, as is true of all additional range values described herein). In some embodiments, a light pulse in output 99 is between 1.001 kW and 2 kW. In some embodiments, a light pulse in output 99 is between 2.001 kW and 4 kW. In some embodiments, a light pulse in output 99 is between 4.001 kW and 10 kW. In some embodiments, a light pulse in output 99 is between 10.001 kW and 20 kW. In some embodiments, a light pulse in output 99 is between 20.001 kW and 40 kW. In some embodiments, a light pulse in output 99 is between 40.001 kW and 100 kW. In some embodiments, a light pulse in output 99 is between 100.1 kW and 200 kW. In some embodiments, a light pulse in output 99 is between 200.1 kW and 400 kW. In some embodiments, a light pulse in output 99 is between 400.1 kW and 1.0 megawatt (MW). In some embodiments, a light pulse in output 99 is between 1.0001 MW and 2.0 MW. In some embodiments, a light pulse in output 99 is between 2.0001 MW and 4 MW. In some embodiments, a light pulse in output 99 is between 4.0001 MW and 10 MW. In some embodiments, a light pulse in output 99 is between 10.0001 MW and 100 MW. In some embodiments, a light pulse in output 99 exceeds 100 MW.

In some embodiments, the present invention provides a method that includes generating a laser beam; propagating the laser beam in a forward-traveling direction in an input optical fiber; splitting the forward-traveling laser beam from the input optical fiber into a plurality of portions including a first portion having majority of the forward-traveling laser beam and a second portion having a minority of the forward-traveling laser beam; directing the first portion of the forward-traveling laser beam into a first output optical fiber and directing the second portion of the forward-traveling laser beam into a second output optical fiber; and directing at least a first portion of a backward-traveling laser beam from the first output optical fiber into a third output optical fiber.

Some embodiments of the method further include opto-isolating the forward-traveling laser beam before the splitting of the forward-traveling laser beam from the input optical fiber into the plurality of portions.

Some embodiments of the method further include providing a sealed enclosure having a plurality of fittings including a first fitting for accepting the first output optical fiber, a second fitting for accepting the second output optical fiber, a third fitting for accepting the third output optical fiber, and a fourth fitting for accepting the input optical fiber, and performing, inside the sealed enclosure, the opto-isolating of the forward-traveling laser beam from the input optical fiber, and the splitting of the forward-traveling laser beam from the input optical fiber into a plurality of portions.

Some embodiments of the method further include providing a sealed enclosure having a plurality of fittings including a first fitting for accepting the first output optical fiber, a second fitting for accepting the second output optical fiber, a third fitting for accepting the third output optical fiber, and a fourth fitting for accepting the first input optical fiber, and performing, inside the sealed enclosure, wherein the splitting of the forward-traveling laser beam from the input optical fiber into the plurality of portions.

In some embodiments, the splitting of the forward-traveling laser beam from the input optical fiber into the plurality of portions includes reflecting the first portion of the forward-traveling laser beam and transmitting the second portion of the forward-traveling laser beam.

In some embodiments, the splitting of the forward-traveling laser beam from the input optical fiber into a plurality of portions includes evanescently coupling the second portion of the forward-traveling laser beam from the input optical fiber into the second output optical fiber, and wherein the directing of at least the first portion of the backward-traveling laser beam from the first output optical fiber into the third output optical fiber includes evanescently coupling at least the first portion of the backward-traveling laser beam from the first output optical fiber into the third output optical fiber.

Some embodiments of the method further include fusing a middle portion of a first source fiber to a middle portion of a second fiber to form an evanescent coupler, wherein the input optical fiber and the first output optical fiber are two end portions of the first source fiber at opposite sides of the middle portion of the first source fiber, and the second output fiber and the third output fiber are two end portions of the second fiber at opposite sides of the middle portion of the second fiber, wherein the splitting of the forward-traveling laser beam from the input optical fiber into a plurality of portions includes evanescently coupling the second portion of the forward-traveling laser beam from the input optical fiber into the second output optical fiber using the evanescent coupler, and wherein the directing of at least the first portion of the backward-traveling laser beam from the first output optical fiber into the third output optical fiber includes evanescently coupling at least the first portion of the backward-traveling laser beam from the first output optical fiber into the third output optical fiber using the evanescent coupler.

Some embodiments of the method further include applying pump light to a gain fiber; amplifying the laser beam in the gain fiber; analyzing the second portion of the forward-traveling laser beam and at least the first portion of a backward-traveling laser beam; and controlling, based on results of the analyzing, at least one of the generating of the laser beam and the amplifying of the laser beam.

In some embodiments, the present invention provides an apparatus that includes a source of a laser beam; a signal-input fiber optically coupled to the source to propagate the laser beam in a forward-traveling direction in the input optical fiber; a signal-output fiber; a forward-tap output fiber; a backward-tap output fiber; a beam splitter optically coupled to the input fiber, the signal-output fiber, the forward-tap fiber, and the backward tap fiber, and configured to split the forward-traveling laser beam from the input optical fiber into a plurality of portions including a first portion having majority of the forward-traveling laser beam directed into the signal-output fiber and a second portion having a minority of the forward-traveling laser beam directed into the forward-tap output fiber and to direct at least a portion of any backward-propagating light from the signal-output fiber into the backward-tap output fiber.

Some embodiments of the apparatus further include an opto-isolator to optically isolate the forward-traveling laser beam before the beam splitter.

Some embodiments of the apparatus further include a sealed enclosure having a plurality of fittings including a first fitting for the signal-input fiber, a second fitting for the signal-output fiber, a third fitting for the forward-tap output fiber, and a fourth fitting for the backward-tap output fiber, and wherein the beam splitter and opto-isolator are enclosed within the sealed enclosure.

Some embodiments of the apparatus further include a sealed enclosure having a plurality of fittings including a first fitting for the signal-input fiber, a second fitting for the signal-output fiber, a third fitting for the forward-tap output fiber, and a fourth fitting for the backward-tap output fiber, and wherein the beam splitter is enclosed inside the sealed enclosure.

In some embodiments, the beam splitter reflects the first portion of the forward-traveling laser beam and transmits the second portion of the forward-traveling laser beam, in order to split the forward-traveling laser beam from the input optical fiber into the plurality of portions.

In some embodiments, the beam splitter includes an evanescent coupler that evanescently couples the second portion of the forward-traveling laser beam from the input optical fiber to direct the minority of the forward-traveling laser beam into the forward-tap output fiber, and wherein the beam splitter evanescently couples the portion of any backward-propagating light from the signal-output fiber into the backward-tap output fiber.

In some embodiments, the beam splitter further includes a middle portion of a first source fiber that is fused to a middle portion of a second fiber to form an evanescent-coupler beam splitter such that the input optical fiber and the first output optical fiber are two end portions of the first source fiber at opposite sides of the middle portion of the first source fiber, and the second output fiber and the third output fiber are two end portions of the second fiber at opposite sides of the middle portion of the second fiber.

Some embodiments further include a gain fiber; a source of pump light operative coupled to the gain fiber; an analyzer functionally coupled to the second portion of the forward-traveling laser beam and at least the portion of a backward-traveling laser beam and that generates an analysis signal; and a controller that is operatively coupled to receive the analysis signal from the analyzer and that, based on the analysis signal by the analyzer, controls at least one of the source of the laser beam and the source of the pump light.

In some embodiments, the present invention provides an apparatus that includes (structures as described herein and equivalents thereof) means for generating a laser beam; input optical-fiber means for propagating the laser beam in a forward-traveling direction; means for splitting the forward-traveling laser beam from the input optical-fiber means into a plurality of portions including a first portion having majority of the forward-traveling laser beam and a second portion having a minority of the forward-traveling laser beam; first output optical-fiber means for propagating a first forward laser signal output beam, second output optical fiber means for propagating a first forward laser beam tap signal, and third output optical fiber means for propagating a first backward-traveling laser beam tap signal; means for directing the first portion of the forward-traveling laser beam into the first output optical-fiber means; means for directing the second portion of the forward-traveling laser beam into the second output optical-fiber means; and means for directing at least a first portion of a backward-traveling laser beam from the first output optical fiber means into the third output optical-fiber means.

Some embodiments further include means for opto-isolating the forward-traveling laser beam before the means for splitting the forward-traveling laser beam from the input optical-fiber means into the plurality of portions.

In some embodiments, the means for splitting the forward-traveling laser beam from the input optical-fiber means into the plurality of portions includes means for evanescently coupling the second portion of the forward-traveling laser beam from the input optical fiber into the second output optical fiber means, and wherein the means for directing of at least the first portion of the backward-traveling laser beam from the first output optical fiber means into the third output optical fiber means includes means for evanescently coupling at least the first portion of the backward-traveling laser beam from the first output optical fiber means into the third output optical fiber means.

Some embodiments further include fiber means for amplifying the laser beam; means for applying pump light to the fiber means for amplifying; means for analyzing the first forward laser beam tap signal and at least the first portion of a backward-traveling laser beam; and means for controlling, based on results of the analyzing, at least one of the means for generating of the laser beam and the means for amplifying of the laser beam.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:
1. A method comprising:
    generating a seed-signal laser beam;
    propagating the seed-signal laser beam in a forward-traveling direction in a core of an input optical fiber;
    splitting the forward-traveling seed-signal laser beam from the core of the input optical fiber into a plurality of portions including a first portion having majority of the forward-traveling seed-signal laser beam and a second portion having a minority of the forward-traveling seed-signal laser beam;
    directing the first portion of the forward-traveling seed-signal laser beam into a core of a first output optical gain fiber and directing the second portion of the forward-traveling seed-signal laser beam into a core of a second output optical fiber;
    amplifying the first portion of the forward-traveling seed-signal laser beam in the first output optical gain fiber;
    directing at least a first portion of a backward-traveling laser beam from the core of the first output optical gain fiber into a third output optical fiber; and analyzing the second portion of the forward-traveling seed-signal laser beam and analyzing at least the first portion of the backward-traveling laser beam.

2. The method of claim 1, further comprising:
opto-isolating the forward-traveling seed-signal laser beam before the splitting of the forward-traveling seed-signal laser beam from the core of the input optical fiber into the plurality of portions.

3. The method of claim 2, further comprising:
providing a sealed enclosure having a plurality of fittings including a first fitting for accepting the first output optical fiber, a second fitting for accepting the second output optical fiber, a third fitting for accepting the third output optical fiber, and a fourth fitting for accepting the input optical fiber, and
performing, inside the sealed enclosure, the opto-isolating of the forward-traveling seed-signal laser beam from the input optical fiber, and the splitting of the forward-traveling seed-signal laser beam from the core of the input optical fiber into a plurality of portions.

4. The method of claim 1, further comprising:
providing a sealed enclosure having a plurality of fittings including a first fitting for accepting the first output optical fiber, a second fitting for accepting the second output optical fiber, a third fitting for accepting the third output optical fiber, and a fourth fitting for accepting the first input optical fiber, and
performing, inside the sealed enclosure, the splitting of the forward-traveling seed-signal laser beam from the core of the input optical fiber into the plurality of portions.

5. The method of claim 1, wherein the splitting of the forward-traveling seed-signal laser beam from the core of the input optical fiber into the plurality of portions includes reflecting the first portion of the forward-traveling seed-signal laser beam and transmitting the second portion of the forward-traveling seed-signal laser beam.

6. The method of claim 1, wherein the splitting of the forward-traveling seed-signal laser beam from the core of the input optical fiber into a plurality of portions includes evanescently coupling the second portion of the forward-traveling seed-signal laser beam from the core of the input optical fiber into the core of second output optical fiber, and wherein the directing of at least the first portion of the backward-traveling laser beam from the core of the first output optical fiber into the third output optical fiber includes evanescently coupling at least the first portion of the backward-traveling laser beam from the core of first output optical fiber into the third output optical fiber.

7. The method of claim 1, further comprising:
fusing a middle portion of a first source fiber to a middle portion of a second fiber to form an evanescent coupler, wherein the input optical fiber and the first output optical fiber are two end portions of the first source fiber at opposite sides of the middle portion of the first source fiber, and the second output fiber and the third output fiber are two end portions of the second fiber at opposite sides of the middle portion of the second fiber,
wherein the splitting of the forward-traveling seed-signal laser beam from the core of the input optical fiber into a plurality of portions includes evanescently coupling the second portion of the forward-traveling seed-signal laser beam from the core of the input optical fiber into the core of second output optical fiber using the evanescent coupler, and
wherein the directing of at least the first portion of the backward-traveling laser beam from the core of first output optical fiber into the third output optical fiber includes evanescently coupling at least the first portion of the backward-traveling laser beam from the core of first output optical fiber into the third output optical fiber using the evanescent coupler.

8. The method of claim 1, further comprising:
applying pump light to the first output optical gain fiber; and
controlling, based on results of the analyzing, at least one of the generating of the forward-traveling seed-signal laser beam and the amplifying of the laser beam.

9. An apparatus comprising:
a source of a seed-signal laser beam;
a signal-input optical fiber optically coupled to the source to propagate the seed-signal laser beam in a forward-traveling direction in a core of the input optical fiber;
a signal-output optical gain fiber;
a forward-tap output fiber;
a backward-tap output fiber;
a beam splitter optically coupled to the input fiber, the signal-output gain fiber, the forward-tap fiber, and the backward tap fiber, and configured to split the forward-traveling seed-signal laser beam from the core of input optical fiber into a plurality of portions including a first portion having a majority of the forward-traveling seed-signal laser beam directed into a core of the signal-output optical gain fiber and a second portion having a minority of the forward-traveling seed-signal laser beam directed into the forward-tap output fiber and to direct at least a portion of any backward-propagating light from the signal-output gain fiber into the backward-tap output fiber; and
an analyzer functionally coupled to the second portion of the forward-traveling seed-signal laser beam and at least the portion of a backward-traveling laser beam and that generates an analysis signal.

10. The apparatus of claim 9, further comprising:
an opto-isolator to optically isolate the forward-traveling seed-signal laser beam before the beam splitter.

11. The apparatus of claim 10, further comprising:
a sealed enclosure having a plurality of fittings including a first fitting for the signal-input fiber, a second fitting for the signal-output optical gain fiber, a third fitting for the forward-tap output fiber, and a fourth fitting for the backward-tap output fiber, and wherein the beam splitter and opto-isolator are enclosed within the sealed enclosure.

12. The apparatus of claim 9, further comprising:
a sealed enclosure having a plurality of fittings including a first fitting for the signal-input fiber, a second fitting for the signal-output optical gain fiber, a third fitting for the forward-tap output fiber, and a fourth fitting for the backward-tap output fiber, and wherein the beam splitter is enclosed inside the sealed enclosure.

13. The apparatus of claim 9, wherein the beam splitter reflects the first portion of the forward-traveling seed-signal laser beam and transmits the second portion of the forward-traveling seed-signal laser beam, in order to split the forward-traveling seed-signal laser beam from the input optical fiber into the plurality of portions.

14. The apparatus of claim 9, wherein the beam splitter includes an evanescent coupler that evanescently couples the second portion of the forward-traveling seed-signal laser beam from the input optical fiber to direct the minority of the forward-traveling seed-signal laser beam into the forward-tap output fiber, and wherein the beam splitter evanescently couples the portion of any backward-propagating light from the signal-output optical gain fiber into the backward-tap output fiber.

15. The apparatus of claim 9, wherein the beam splitter further comprises:
a middle portion of a first source fiber that is fused to a middle portion of a second fiber to form an evanescent-coupler beam splitter such that the input optical fiber and the signal-output optical gain fiber are two end portions of the first source fiber at opposite sides of the middle portion of the first source fiber, and the second output fiber and the third output fiber are two end portions of the second fiber at opposite sides of the middle portion of the second fiber.

16. The apparatus of claim 9, further comprising:
a source of pump light operative coupled to the signal-output optical gain fiber; and
a controller that is operatively coupled to receive the analysis signal from the analyzer and that, based on the analysis signal by the analyzer, controls at least one of the source of the seed-signal laser beam and the source of the pump light.

17. An apparatus comprising:
means for generating a seed-signal laser beam;
input optical-fiber core means for propagating the seed-signal laser beam in a forward-traveling direction;
means for splitting the forward-traveling seed-signal laser beam from the input optical-fiber core means into a plurality of portions including a first portion having majority of the forward-traveling seed-signal laser beam and a second portion having a minority of the forward-traveling seed-signal laser beam;
first output optical-fiber gain means for propagating and amplifying a first forward laser signal output beam, second output optical fiber means for propagating a first forward laser beam tap signal, and third output optical fiber means for propagating a first backward-traveling laser beam tap signal;
means for directing the first portion of the forward-traveling seed-signal laser beam into the first output optical-fiber gain means;
means for directing the second portion of the forward-traveling seed-signal laser beam into the second output optical-fiber means;
means for directing at least a first portion of a backward-traveling laser beam from the first output optical fiber gain means into the third output optical-fiber means; and
means for analyzing the first forward seed-signal laser beam tap signal and means for analyzing at least the first portion of a backward-traveling laser beam.

18. The apparatus of claim 17, further comprising:
means for opto-isolating the forward-traveling seed-signal laser beam before the means for splitting the forward-traveling seed-signal laser beam from the input optical-fiber means into the plurality of portions.

19. The apparatus of claim 17, wherein the means for splitting the forward-traveling seed-signal laser beam from the input optical-fiber means into the plurality of portions includes means for evanescently coupling the second portion of the forward-traveling seed-signal laser beam from a core of the input optical fiber into a core of the second output optical fiber means, and wherein the means for directing of at least the first portion of the backward-traveling laser beam from the core of the first output optical fiber means into the third output optical fiber means includes means for evanescently coupling at least the first portion of the backward-traveling laser beam from the core of the first output optical-fiber gain means into a core of the third output optical fiber means.

20. The apparatus of claim 17, further comprising:
means for applying pump light to the fiber means for propagating and amplifying; and
means for controlling, based on results of the analyzing, at least one of the means for generating of the seed-signal laser beam and the optical-fiber gain means for propagating and amplifying of the seed-signal laser beam.

* * * * *